(12) United States Patent
Yuki et al.

(10) Patent No.: US 8,929,732 B2
(45) Date of Patent: Jan. 6, 2015

(54) ON-VEHICLE COMMUNICATION SYSTEM, OPTICAL COMMUNICATION HARNESS AND OPTICAL DISTRIBUTION APPARATUS

(75) Inventors: Hayato Yuki, Yokkaichi (JP); Takeo Uchino, Yokkaichi (JP)

(73) Assignees: Autonetworks Technologies, Ltd., Mie (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 160 days.

(21) Appl. No.: 13/384,737
(22) PCT Filed: Sep. 24, 2010
(86) PCT No.: PCT/JP2010/066561
§ 371 (c)(1), (2), (4) Date: Jan. 18, 2012
(87) PCT Pub. No.: WO2011/037187
PCT Pub. Date: Mar. 31, 2011

(65) Prior Publication Data
US 2012/0189302 A1 Jul. 26, 2012

(30) Foreign Application Priority Data

Sep. 24, 2009 (JP) .................................. 2009-219418
Apr. 23, 2010 (JP) .................................. 2010-099769

(51) Int. Cl.
H04B 10/08 (2006.01)
H04B 10/20 (2006.01)
(Continued)

(52) U.S. Cl.
CPC ............ *H04L 12/413* (2013.01); *H04L 12/417* (2013.01); *H04B 10/272* (2013.01); *H04L 2012/40273* (2013.01); *H04L 2012/40215* (2013.01); *H04L 12/44* (2013.01)
USPC .................................... 398/36; 398/63; 385/15

(58) Field of Classification Search
USPC ............... 398/36, 140, 58–64, 99; 385/15, 24
See application file for complete search history.

(56) References Cited

U.S. PATENT DOCUMENTS 4,027,153 A * 5/1977 Kach ................................ 398/63
4,491,942 A * 1/1985 Witte et al. ...................... 398/99
(Continued)

FOREIGN PATENT DOCUMENTS

JP A-60-172840 9/1985
JP A-61-57145 3/1986
(Continued)

OTHER PUBLICATIONS

ISO 11898-1:2003. "Road vehicles-Controller area network (CAN)", Part 1: Data link layer and physical signaling, Dec. 1, 2003.

(Continued)

*Primary Examiner* — Ken Vanderpuye
*Assistant Examiner* — Dibson Sanchez
(74) *Attorney, Agent, or Firm* — Oliff PLC

(57) ABSTRACT

Plural optical communication apparatuses are connected through communication lines with a star topology to an optical coupler that is arranged at the center of star topology and can distribute input light. Each optical communication apparatus makes an optically transmitting unit input an optical signal into an optically inputting unit of the optical coupler, and makes an optically receiving unit receive an optical signal output from an optically outputting unit of the optical coupler, for detecting a collision based on the reception signal. After transmitting an optical signal from the optically transmitting unit, each of optical communication apparatuses makes the optically receiving unit receive the optical signal, performs the collision detection based on the comparison between the transmission signal and the reception signal. When having detected the collision, each of optical communication apparatuses stops own processing for transmitting the optical signal and performs processing for receiving optical signals.

17 Claims, 15 Drawing Sheets

(51) Int. Cl.
*G02B 6/26* (2006.01)
*H04L 12/417* (2006.01)
*H04B 10/272* (2013.01)
*H04L 12/413* (2006.01)
*H04L 12/44* (2006.01)
*H04L 12/40* (2006.01)

(56) References Cited

U.S. PATENT DOCUMENTS

| | | | |
|---|---|---|---|
| 4,516,204 A * | 5/1985 | Sauer et al. | 710/113 |
| 4,531,239 A * | 7/1985 | Usui | 370/446 |
| 4,580,872 A * | 4/1986 | Bhatt et al. | 398/99 |
| 4,584,678 A * | 4/1986 | Ozeki et al. | 370/447 |
| 4,628,501 A * | 12/1986 | Loscoe | 398/61 |
| 4,701,909 A * | 10/1987 | Kavehrad et al. | 370/446 |
| 4,723,309 A * | 2/1988 | Mochizuki et al. | 398/37 |
| 4,787,693 A * | 11/1988 | Kogelnik et al. | 385/46 |
| 4,797,879 A * | 1/1989 | Habbab et al. | 398/51 |
| 4,809,363 A * | 2/1989 | Thinschmidt et al. | 398/60 |
| 4,894,819 A * | 1/1990 | Kondo et al. | 398/99 |
| 4,965,792 A * | 10/1990 | Yano | 370/445 |
| 5,019,301 A * | 5/1991 | Coden et al. | 264/1.25 |
| 5,077,728 A * | 12/1991 | Kaminow | 398/89 |
| 5,189,414 A * | 2/1993 | Tawara | 370/502 |
| 5,404,241 A * | 4/1995 | Ota | 398/63 |
| 5,615,036 A * | 3/1997 | Emura | 398/76 |
| 5,684,899 A | 11/1997 | Ota | |
| 5,771,111 A * | 6/1998 | Domon et al. | 398/76 |
| 5,854,700 A * | 12/1998 | Ota | 398/60 |
| 5,915,054 A * | 6/1999 | Ota | 385/46 |
| 6,980,747 B1 * | 12/2005 | DeSalvo et al. | 398/202 |
| 7,218,854 B1 * | 5/2007 | Unitt et al. | 398/63 |
| 7,468,950 B2 * | 12/2008 | Zinke et al. | 370/252 |
| 7,536,104 B2 * | 5/2009 | Dotaro et al. | 398/58 |
| 2003/0215235 A1 * | 11/2003 | Norizuki et al. | 398/59 |
| 2004/0228631 A1 * | 11/2004 | Mantin et al. | 398/83 |
| 2005/0196169 A1 * | 9/2005 | Tian et al. | 398/59 |
| 2006/0212135 A1 * | 9/2006 | Degoul et al. | 700/9 |
| 2011/0208884 A1 * | 8/2011 | Horihata | 710/105 |

FOREIGN PATENT DOCUMENTS

| | | |
|---|---|---|
| JP | A-05-235870 | 9/1993 |
| JP | A-05-252170 | 9/1993 |
| JP | A-05-281436 | 10/1993 |
| JP | A-06-090239 | 3/1994 |
| JP | A-2005-260897 | 9/2005 |
| JP | A-2008-219352 | 9/2008 |
| JP | A-2008-219353 | 9/2008 |
| JP | A-2008-219366 | 9/2008 |

OTHER PUBLICATIONS

ISO 11519-1:1994. "Road vehicles-Low-speed serial data communication", Part 1: General and definitions, Jun. 15, 1994.
Nov. 30, 2010 International Search Report issued in Patent Application No. PCT/JP2010/066561.

* cited by examiner

TWO-INPUT/TWO-OUTPUT

FOUR-INPUT/FOUR-OUTPUT

US 8,929,732 B2

ON-VEHICLE COMMUNICATION SYSTEM, OPTICAL COMMUNICATION HARNESS AND OPTICAL DISTRIBUTION APPARATUS (US) This application is the national phase under 35 U.S.C. §371 of PCT International Application No. PCT/W2010/066561 which has an International filing date of Sep. 24, 2010 and designated the United States of America.

BACKGROUND OF THE INVENTION

1. Field of the Invention

The present invention relates to an on-vehicle communication system that performs communication with plural electronic apparatuses mounted on a vehicle, specifically relates to an on-vehicle communication system that performs optical communication, an optical communication harness and an optical distribution apparatus.

2. Description of Related Art

Many electronic apparatuses are conventionally mounted on a vehicle (e.g., car), and are connected with communication lines to each other. These electronic apparatuses exchange information with each other and work together to control functions regarding travel of the car and to control functions regarding passenger comfort of the car. The controller area network (CAN) is well utilized as the communication standard for implementing the communication with the electronic apparatuses mounted on the car (see non-patent documents 1 and 2).

In addition, it tends to provide a recent car with more electric apparatuses. Thus, it is required to connect many electronic apparatuses to each other with one communication line (CAN bus), and to implement intercommunications between many electronic apparatuses. However, the ringing phenomenon is often caused when many electronic apparatuses are connected to the CAN bus. In other words, the communication failure may be often caused. Hence, these circumstances limit the number of electronic apparatuses connectable to the CAN bus. Furthermore, it is known that the communication failure is caused by the disturbance noise superimposed on the CAN bus, especially near an electronic apparatus and communication line utilizing high-voltage signals, in an area where many electronic apparatuses and communication lines are mounted tightly, e.g., the engine room of a car.

For these problems, it is considered to utilize the optical communication with an optical cable that is insensitive to the electromagnetic noise. It is proposed to partially utilize the optical communication in the field of car industry, too (see patent document 1).

It may be considered that the optical communication is utilized for not only partial communications but also all communications between the electronic apparatuses on a car (i.e., on-vehicle electronic apparatuses). It is preferred to enable the communication system based on this consideration without completely change the conventional electronic apparatus. Thus, such a communication system is preferred to enable utilizing the communication functions based on the conventional communication protocol designed for each electronic apparatus.

Based on the CAN protocol, the CAN bus is configured with a twisted-pair cable transmitting a differential signal and is connected to plural electronic apparatuses. Each electronic apparatus transmits and receives a digital signal represented by the differential signal. Because the CAN is a protocol for the serial communication, only one electronic apparatus among the plural electronic apparatuses connected to the CAN bus can perform the transmission processing and the other electronic apparatuses must wait until said one electronic apparatus has completed the transmission processing. When some electronic apparatuses simultaneously perform the transmission processing (i.e., when the communication collision occurs), each electronic apparatus performs the communication arbitration processing and the transmission processing is performed on a communication having the highest priority.

In order to perform the arbitration processing for addressing the communication collision, each electronic apparatus detects the signal level of the CAN bus at the same time outputting the transmission signal to the CAN bus. In the case that the signal level is changed (from the recessive to the dominant) after each electronic apparatus outputs the transmission signal, the each electronic apparatus determines that the communication collision occurs and stops performing the transmission processing. The dominant signal has a higher priority than the recessive signal. Thus, the electronic apparatus that has transmitted the dominant signal can continuously perform the transmission processing even when the communication collision occurs.

Patent Document 1: Japanese Patent Application Laid-Open No. 2008-219353

Non-Patent Document 1: ISO 11898-1; 2003 Road vehicles—Controller area network (CAN)—Part1; Data link layer and physical signaling Non-Patent Document 2: ISO 11519-1; 1994 Road vehicles—Low-speed serial data communication—Part1; General and definitions

SUMMARY OF THE INVENTION

The optical communication needs an optical communication line for transmitting signals, and a different optical communication line for receiving signals. Thus, each electronic apparatus cannot detect the transmission signal output from itself at the same time when outputting the transmission signal, in the case that the optical communication is utilized for the communication between electronic apparatuses mounted on a car in order to prevent the communication failure caused by the ringing phenomenon, disturbance noise and the like. In other words, it is not possible to perform the communication based on the conventional CAN protocol. It may be required to utilize a new protocol adapted to the optical communication which is different from the CAN, in order to make each electronic apparatus perform the optical communication. Furthermore, it may be required to develop the electronic apparatuses in accordance with the new protocol. These circumstances may increase the development costs.

The optical communication system can be made with a passive star optical coupler (simply call "optical coupler", hereinafter). Assume the case that the optical coupler is utilized for making an optical communication system having many nodes (many electronic apparatuses). In this assumed case, it is expensive to utilize one optical coupler for distributing optical signals to many nodes at a time, because the arrangement of optical communication lines (optical fibers) based on the utilization needs costs. In this assumed case, it is reasonable to make a sub-node in which one optical coupler is connected to an electronic apparatus, and to utilize plural sub-nodes connected to each other with optical couplers for making the optical communication system. For example, it is reasonable to arrange the sub-nodes at several areas in a car, such as the engine room, interior and trunk room, and to connect an optical coupler of one sub-node to an optical coupler of another sub-node, for making the whole optical communication system.

However, when the whole optical communication system is made with optical couplers of plural sub-nodes, there is a problem that optical signals are multiplexed between the optical couplers. Thus, it is required to make the configuration described above perform communications adapted to the CAN protocol for utilizing the CAN protocol even when optical signals are transmitted through optical couplers.

The present invention is made in view of such circumstances, and has an object to provide an on-vehicle communication system, optical communication harness and optical distribution apparatus that can not only implement optical communications but also perform communications based on a predetermined protocol which has been utilized for electrical signals.

The present invention has another object to provide an on-vehicle communication system, optical communication harness and optical distribution apparatus that can not only implement the optical communications between electronic apparatuses (communication apparatuses) mounted on a car and then preventing the effects caused by the ringing phenomenon, disturbance noise and the like, but also perform processing similar to the arbitration processing based on the conventional CAN protocol. The present invention has another object to provide an on-vehicle communication system, optical communication harness and optical distribution apparatus that can configure a large-scale network with optical couplers.

An on-vehicle communication system according to the present invention comprises: an optical distribution device that comprises plural optically inputting units and plural optically outputting unit, and outputs light input from an optically inputting unit to plural optically outputting units, and plural optical communication apparatuses that are connected with a star topology through optical communication lines, wherein the optical distribution device is arranged at a center of the star topology, and each optical communication apparatus further comprises: an optically transmitting unit that inputs light to an optically inputting unit of the optical distribution device to transmit an optical signal; an optically receiving unit that receives light output from an optically outputting unit of the optical distribution device to receive an optical signal; and a detecting means for detecting a collision of optical signals transmitted between communication apparatuses, in accordance with the optical signal received by the optically receiving unit.

In addition, an on-vehicle communication system according to the present invention comprises: the detecting means that is configured to detect the collision when the optical signal received by the optically receiving unit is changed from the optical signal transmitted by the optically transmitting unit; and the optical communication apparatus that is configured to stop transmitting the optical signal and to receive an optical signal transmitted by another optical communication apparatus when the detecting means detects the collision of transmitted optical signals.

In addition, an on-vehicle communication system according to the present invention comprises the optical communication apparatus which further comprises: one or more electrically transmitting units and electrically receiving units that perform transmission of an electrical signal; and an opto-electric converting unit that converts the optical signal received by the optically receiving unit into an electrical signal and converts the electrical signal received by the electrically receiving unit into an optical signal, and the on-vehicle communication system according to the present invention further comprises the optical communication apparatus which is configured to mediate communication between another optical communication apparatus and one or more electrical communication apparatus transmitting electrical signals.

In addition, an on-vehicle communication system according to the present invention further comprises an opto-electric conversion apparatus that comprises: one or more electrically transmitting units and electrically receiving units that perform transmission of electrical signals with the optically transmitting unit, the optically receiving unit and the detecting means; and an opto-electric converting unit that converts the optical signal received by the optically receiving unit into an electrical signal and converts the electrical signal received by the electrically receiving unit into an optical signal, wherein the opto-electric conversion apparatus mediates communications between said one or more optical communication apparatus and one or more apparatuses performing transmission of electrical signals.

In addition, an on-vehicle communication system according to the present invention further comprises plural optical communication networks, each of which comprises the optical communication apparatus connected with a star topology where the optical distribution device is arranged at the center, and comprises the opto-electric conversion apparatus, wherein opto-electric conversion apparatuses of the plural optical communication networks are connected through an electrical communication line.

In addition, an on-vehicle communication system according to the present invention comprises plural optical communication lines, each of which connects an optically inputting unit of an optical distribution device with the optical communication apparatus or the opto-electric conversion apparatus, wherein a length of an optical communication line is substantially the same as a length of another optical communication line.

In addition, an on-vehicle communication system according to the present invention further comprises plural optical distribution devices other than the optical distribution device, in which an optically inputting unit of an optical distribution device is connected to an optically outputting unit of another optical distribution device, wherein the plural optical communication apparatus are respectively connected with a star topology through an optical communication line to a part of the optical inputting unit and the optically outputting unit comprised by the plural optical distribution device.

In addition, an on-vehicle communication system according to the present invention further comprises one or more filters that are connected to an optically outputting unit of another optical distribution device among the plural optically outputting units of the plural optical distribution devices, and attenuate light whose wavelengths are different from wavelengths of optical signals transmitted by the plural optical communication apparatuses.

In addition, an on-vehicle communication system according to the present invention further comprises: a first optical distribution device and a second optical distribution device, in which an optically inputting unit of the first optical distribution device is connected to an optically outputting unit of the second optical distribution device and an optically outputting unit of the first optical distribution device is connected to an optically inputting unit of the second optical distribution device; plural first optical communication apparatuses and plural second communication apparatuses, which are respectively connected to parts of the optically inputting units and optically outputting units of the first and second optical distribution devices with a star topology through optical communication lines, and transmit optical signals having a first wavelength or a second wavelength and receive optical signals having different wavelengths including the first wavelength or the second wavelength; a first filter that is connected between the optically outputting unit of the first optical distribution device and the optically inputting unit of the second optical distribution device and attenuates light having the second wavelength; and a second filter that is connected between the optically outputting unit of the second optical distribution device and the optically inputting unit of the first optical distribution device and attenuates light having the first wavelength.

In addition, an on-vehicle communication system according to the present invention comprises the optical communication apparatus that is configured to perform transmission of optical signals based on a CAN protocol.

In addition, an on-vehicle communication system according to the present invention comprises the optical distribution device that is configured with one or more optical couplers, each of which comprises two of the optically inputting unit and two of the optically outputting unit.

In addition, an optical communication harness according to the present invention comprises: an optical distribution device that comprises plural optically inputting units and plural optically outputting units and distributes and outputs light input from one of the optically inputting units to plural optically outputting units; an optical communication line that is connected to an predetermined optically inputting unit and optically outputting unit among the plural optically inputting units and optically outputting units; and one or more filters that are connected to optical communication lines connected to specific optically outputting units among the plural optically outputting units and attenuate light having a predetermined wavelength.

In addition, an optical communication harness according to the present invention comprises the filter that is arranged inside a connector of the optical communication line which is for connecting to another optical distribution device.

In addition, an optical distribution apparatus according to the present invention comprises: an optical distribution device that comprises plural optically inputting units and plural optically outputting units and distributes and outputs light input from one of the optically inputting units to plural optically outputting units; and one or more filters that are connected to specific optically outputting units among the plural optically outputting units and attenuate light having a predetermined wavelength.

According to an aspect of the present invention, the utilized optical distribution device comprises plural optically inputting units and optically outputting units and distributes and outputs light input from one optically inputting unit to plural optically outputting units. This optical distribution device is connected through optical communication lines to plural optical communication apparatuses with a star topology, to configure the on-vehicle communication system. When optical signals are input from plural inputting units into this optical distribution device, plural optical signals are combined and the combined optical signals are output from all optically outputting units.

Each optical communication apparatus is connected to one optically inputting unit and one optically outputting unit of the optical distribution device through the optical communication lines. The optical communication apparatus can receive the optical signal distributed and output by the optical distribution device, at the time when transmitting an optical signal to said one optically inputting unit of the optical distribution device. In addition, the optical communication apparatus can compare the optical signal transmitted by the optical communication apparatus itself with the optical signal received by the optical communication apparatus itself, and then detect the collision of transmitted optical signals.

Hence, the optical communication apparatus can correspond the presence/absence of light to the dominant/recessive of the CAN protocol, perform processing similar to the arbitration processing based on the CAN protocol, and perform communications based on the CAN protocol. Therefore, the optical communication apparatus according to the present invention can be implemented with a conventional communication apparatus that is simply provided with an interface circuit and the like for connecting to the optical communication line, and it is possible to develop the optical communication apparatus with lower costs.

According to an aspect of the present invention, the optical communication apparatus detects the collision between the optical signal transmitted by the optical communication apparatus itself and another optical signal transmitted by another optical communication apparatus, when the optical signal received by the optical communication apparatus itself through the optical distribution device is changed from the optical signal transmitted by the optical communication apparatus itself. When having detected the collision, the optical communication apparatus stops transmitting the optical signal, and receives said another optical signal transmitted by said another optical communication apparatus. These processing, such as the collision detection and the transmission stop, are based on a method for the optical communication, substantially the same as the method utilized for the arbitration processing of the CAN protocol. Therefore, the optical communication apparatus according to the present invention can be implemented with relatively minor modifications, such as a circuit modification or circuit addition, on the communication apparatus performing communications based on the conventional CAN protocol.

According to an aspect of the present invention, the on-vehicle communication system includes one or more optical communication apparatuses that are provided with a function for performing transmission of optical signals and further with a function for performing transmission of electrical signals. This optical communication apparatus is made to perform mutual conversion between the transmitted electrical signals and optical signals, and to mediate communications between another optical communication apparatus and the electrical communication apparatus. Therefore, the on-vehicle communication system can perform both the electrical communication and the optical communication.

Alternatively, the on-vehicle communication system includes the opto-electric conversion apparatus that is provided with an optical communication function and electrical communication function and performs mutual conversion between electrical signals and optical signals. This opto-electric conversion apparatus is made to mediate communications between one or more optical communication apparatuses and one or more electrical communication apparatuses. Therefore, the on-vehicle communication system can similarly perform both the electrical communication and the optical communication.

A communication line included in the on-vehicle communication system is arranged within a limited area of a car. Thus, the arranged communication line may be bent. However, it is difficult to bend an optical communication line for the arrangement, in the case that the optical communication line is an optical fiber. In other words, there is a problem that the optical fiber has a limited freedom for arrangement. On the other hands, the electrical communication line shows higher resistance against the bending. Because the on-vehicle communication system can utilize not only the optical communication line but also the electrical communication line, it is possible to improve the freedom for arrangement regarding the on-vehicle communication system in a car.

According to an aspect of the present invention, an optical communication network is configured with the optical communication apparatus and opto-electric conversion apparatus connected in a star topology whose center is the optical distribution device, and then the opto-electric conversion apparatuses of plural optical communication networks are connected through electrical communication lines, in order to build the on-vehicle communication system. Therefore, the on-vehicle communication system can perform the optical communication within the star topology optical communication network, and perform the electrical communication between an optical communication network and the other optical communication networks.

For example, it is possible to select the optical communication at an area where many devices are arranged tightly, such as an engine room in the front portion of a car, and to select the electrical communication at an area whose distance is relatively longer and where the communication line is likely to be bent, such as an area between the front portion of the car and the back portion of the car. Therefore, it is possible to make a configuration in view of the strength and weakness of the optical communication and electrical communication. Such a configuration according to the present invention is preferred especially for a car that is likely to include many devices at some areas, respectively.

According to an aspect of the present invention, one optical distribution device included in the on-vehicle communication system includes an optically inputting unit, and then an optical communication line connecting this optically inputting unit to the optical communication apparatus is configured to have a length substantially the same as a length of another optical communication line connecting this optically inputting unit to the opto-electric conversion apparatus. Therefore, there is almost no lag between timing when an optical signal is input from the optical communication apparatus to the optical distribution device and timing when an optical signal is input from the opto-electric conversion apparatus to the optical distribution device, and it is possible to accurately perform processing, such as the communication collision detection processing and the arbitration processing.

According to an aspect of the present invention, an optical communication apparatus is provided with plural optical distribution devices, each of which includes plural optically inputting units and optically outputting units and distributes and outputs light, input from one of optically inputting units, to optically outputting units, optical communication apparatuses are connected to each other with a star topology through optical communication lines, and each optical communication apparatus transmits an optical signal to an optically inputting unit of the optical distribution device and receives an optical signal output from an optically outputting unit of the optical distribution device.

An optically inputting unit of an optical distribution device is connected to an optically outputting unit of another optical distribution device. Therefore, it is possible to fully utilize the optical communication.

When an optical signal is transmitted by an optical communication apparatus connected to the optical distribution device, the transmitted optical signal is input into an optically inputting unit of one optical distribution device and then output from an optically outputting unit of said one optical distribution device. One of optically outputting units is connected to this optical communication apparatus that has transmitted this optical signal. Therefore, this optical communication apparatus can monitor the optical signal transmitted by this optical communication apparatus itself. This optical signal is output from the optically outputting unit of this optical distribution device to another optical communication apparatus connected with a star topology, too. Therefore, each optical communication apparatus can receive this optical signal, and this optical signal can be input into an optically inputting unit of another optical distribution device. Then, said another optical distribution device also distributes and outputs this optical signal from its own optically outputting units. Thus, the optical communication apparatus also receives this optical signal, because connected with a star topology.

Therefore, it is possible to make the optical communication become communication based on the CAN protocol which includes the collision detection processing, arbitration processing and the like.

According to an aspect of the present invention, there is an optically outputting unit that is not connected to the optical communication apparatus, among the optically outputting units included by each optical distribution device. In other words, there is an optically outputting unit that is connected to another optical distribution device. Such an optically outputting unit is connected to one or more filters that attenuate light having a wavelength different from a wavelength of the optical signal transmitted by the optical communication apparatus.

Thus, when an optical signal is transmitted by an optical communication apparatus that is connected to an optical distribution device, this optical signal is input into the optical distribution device, output to another optical communication apparatus connected to the optical distribution device, and further output toward an inputting unit of another optical distribution device without being attenuated. Said another optical distribution device makes each optically outputting unit output light that is input from the optically inputting unit. In other words, said another optical distribution device outputs any input light, regardless of the source optical distribution device that has output and input into said another optical distribution device. Another filter connected to another distribution device attenuates light having a wavelength different from a wavelength of an optical signal transmitted by an optical communication apparatus that is connected to said another distribution device. Therefore, the light output by an optical distribution device does not return to the optical distribution device because attenuated by the filter, although the output light may be input into another optical distribution device and output from said another optical distribution device.

According to an aspect of the present invention, the optical communication apparatus performs communications based on a predetermined protocol that is utilized for comparing an optical signal during the transmission processing and an optical signal during the reception processing and determining whether the transmission processing is succeeded or not. The optical communication apparatus according to the present invention is configured to transmit an optical signal, to an optical distribution device, which is input into the optical communication apparatus again. Therefore, the optical signal transmitted by the optical communication apparatus is returned to the optical communication apparatus, even during the transmission processing, and it is possible to perform communications based on the predetermined protocol. The "predetermined protocol" is, for example the CAN.

According to an aspect of the present invention, the optical distribution device can be made with one or more two-input/two-output optical couplers that are relatively inexpensive. Therefore, it is possible to save the cost of the on-vehicle communication system. In an example case that the optical communication is performed between two optical communication apparatuses, one optical coupler is enough for the on-vehicle communication system. In an example case that the optical communication is performed between four optical communication apparatuses, four optical couplers are enough for the on-vehicle communication system. In an example case that the optical communication is performed between eight optical communication apparatuses, twelve optical couplers are enough for the on-vehicle communication system.

According to an aspect of the present invention, it provides plural optical distribution devices, optical communication lines respectively connected to the plural optical distribution devices, and filters that respectively attenuate light having wavelengths different from wavelengths of optical signals transmitted by optical communication apparatuses that are respectively connected to optical distribution devices. The plural optical distribution devices, optical communication lines and filters are previously connected to form the harness. Therefore, when the harness is connected to optical communication apparatuses, it is possible to easily configure the optical communication system that can perform communication based on the predetermined protocol.

In the present invention, the filter may be arranged inside a connector that connects a harness and another harness. In the case that a harness and another harness are connected as described above, it is possible to easily configure the optical communication system that can perform communication based on the predetermined protocol.

In the present invention, the optical distribution apparatus may be configured with the filter and optical distribution device. In the case that plural optical distribution apparatuses are connected to each other whose wavelengths of light attenuated by respective filters are different and are respectively connected to optical communication apparatuses that correspond to wavelengths of filters included by the connected optical distribution apparatuses, it is possible to easily configure the optical communication system that can perform communication based on the predetermined protocol.

In the present invention, plural optical communication apparatuses may be connected with a star topology whose center is the optical distribution device, and each optical communication apparatus may be configured to transmit an optical signal to an optically inputting unit of the optical distribution device and receive an optical signal output by the optical distribution device, and perform the collision detection in accordance with the received optical signal. Hence, the on-vehicle communication system can utilize the optical communication with preventing the ringing phenomenon, disturbance noise and the like, and further can perform processing similar to the communication processing based on the conventional CAN protocol. Therefore, it is possible to save costs for implementing the on-vehicle communication system that can perform the optical communication.

In the present invention, plural optical communication apparatuses may be connected to the optical distribution device and the optical distribution device may be further connected to another optical distribution device, in order to configure the communication system. Hence, each optical communication apparatus performing the optical communication can constantly monitor signals transmitted onto a communication line which includes signals transmitted by the monitoring optical communication apparatus. Therefore, it is possible to make the optical communication implement communications based on the CAN protocol that is utilized for essentially performing the collision detection processing, arbitration processing and the like.

The above and further objects and features of the invention will more fully be apparent from the following detailed description with accompanying drawings.

DESCRIPTION OF THE PREFERRED EMBODIMENTS

Embodiment 1

Figure 1:
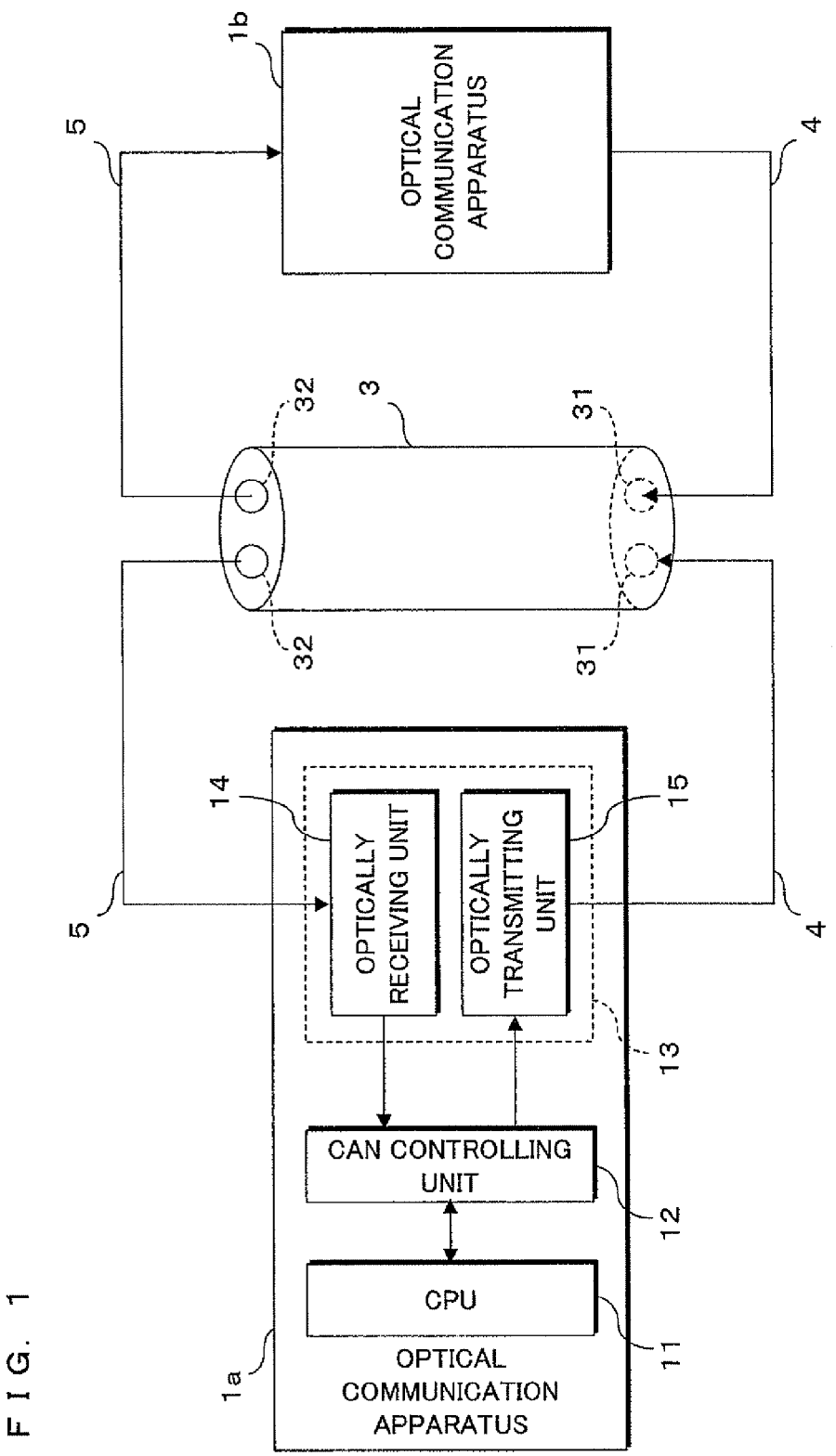
FIG. 1 is a block diagram showing a configuration of an on-vehicle communication system in an embodiment 1 according to the present invention.

The present invention will be described in reference to figures that show embodiments according to the present invention. FIG. 1 is a block diagram showing a configuration of an on-vehicle communication system in an embodiment 1 according to the present invention. The on-vehicle communication system in the embodiment 1 is configured with plural (two) optical communication apparatuses 1a, 1b that are respectively connected to an optical coupler 3 through optical communication lines 4, 5, and is a star topology network system where the optical coupler 3 is arranged at the center.

The optical communication apparatuses 1a, 1b included in the on-vehicle communication system are electronic apparatuses, such as electronic control units (ECUs), which are provided with optical communication functions and mounted on a car (not shown). Although FIG. 1 shows a detailed configuration of the optical communication apparatus 1a, FIG. 1 omits a detailed configuration of another optical communication apparatus 1b because these detailed configurations are similar to each other. Each of optical communication apparatuses 1a, 1b includes a central processing unit (CPU) 11, a CAN controlling unit 12 and an optically communicating unit 13.

The CPU 11 included by each of the optical communication apparatuses 1a, 1b executes a program previously stored in a storage, such as a read only memory (ROM), to perform processing, e.g., the operation control regarding each component included by the apparatus, several calculations required for the control, and the like. When either of the optical communication apparatuses 1a, 1b requires exchanging information with another of the optical communication apparatuses 1a, 1b during these processing, the CPU 11 provides a communication indication to the CAN controlling unit 12 to enable communicating with another of optical communication apparatuses 1a, 1b. When trying to transmit data to another of optical communication apparatuses 1a, 1b, the CPU 11 provides these data to the CAN controlling unit 12. In addition, when receiving data from another of optical communication apparatuses 1a, 1b, the CAN controlling unit 12 provides these received data to the CPU 11.

When data to be transmitted are provided by the CPU 11, the CAN controlling unit 12 converts these data into transmission data based on the data format that is utilized for the CAN protocol, and provides the converted data to an optically transmitting unit 15 included in an optically communicating unit 13. Data transmitted in accordance with the CAN protocol are configured with plural fields, such as an arbitration field, control field, data field, cyclic redundancy check (CRC) field, and acknowledgement (ACK) field. The data provided by the CPU 11 is stored in the data field. The arbitration field is configured to store data utilized for arbitrating the communication collision. The data stored in the arbitration field are based on the priority of data transmitted in accordance with the CAN protocol. Data "0 (dominant)" represents a higher priority than data "1 (recessive)".

The CAN controlling unit 12 takes data received by the optically receiving unit 14 in the optically communicating unit 13. As the data received by the optically receiving unit 14 is in a data format based on the CAN protocol, the CAN controlling unit 12 extracts required data from the data field of the received data, and provides the extracted data to the CPU 11. Therefore, the CPU 11 can perform processing based on data received from another of optical communication apparatuses 1a, 1b.

As the optically communicating unit 13 includes the optically receiving unit 14 and optically transmitting unit 15, the optically communicating unit 13 can perform mutual conversion between electrical signals and optical signals. The electrical signals are transmitted between the optically communicating unit 13 and the CAN controlling unit 12, but the optical signals are transmitted between either of the optical communication apparatuses 1a, 1b and another of optical communication apparatuses 1a, 1b. The optically transmitting unit 15 in the optically communicating unit 13 is configured with a light source (e.g., a light emitting diode), a drive circuit that turns on/off the light source, and the like. As provided with the transmission data by the CAN controlling unit 12, the optically transmitting unit 15 converts the transmission data configured with electrical signals into the transmission data configured with optical signals. Then, the optically transmitting unit 15 outputs the converted optical signals to the transmission optical communication line 4.

The optically receiving unit 14 in the optically communicating unit 13 is configured with a light receiving element, such as a photodiode, and is able to detect light emitted from the reception optical communication line 5. The optically receiving unit 14 can output electrical signals based on the light that is detected by the light receiving element. Therefore, the optically receiving unit 14 in either of optical communication apparatuses 1a, 1b can receive optical signals transmitted by another of optical communication apparatuses 1a, 1b, convert the received optical signals into the electrical signals and provide the converted electrical signals to the CAN controlling unit 12.

The optical coupler 3 in the on-vehicle communication system is configured to include two optically inputting units 31, 31 at one side, and include two optically outputting units 32, 32 at the other side. Thus, the optical coupler 3 is an optical distribution device that distributes the light input from the optically inputting unit 31 to two optically outputting units 32, 32, i.e., outputs the light to two optically outputting units 32, 32. The first optically inputting unit 31 included by the optical coupler 3 is connected through the optical communication line 4 to the optically transmitting unit 15 included by the optical communication apparatus 1a, and the second optically inputting unit 31 is connected through the optical communication line 4 to the optically transmitting unit 15 included by another optical communication apparatus 1b. The first optically outputting unit 32 included by the optical coupler 3 is connected through the optical communication line 5 to the optically receiving unit 14 included by the optical communication apparatus 1a, and the second optically outputting unit 32 is connected through the optical communication line 5 to the optically receiving unit 14 included by another optical communication apparatus 1b.

When the optically transmitting unit 15 included by the optical communication apparatus 1a transmits an optical signal through the optical communication line 4, the transmitted optical signal is input into the inputting unit 31 included by the optical coupler 3. The input optical signal is distributed by the optical coupler 3 and is output from two optically outputting units 32, 32. Then, the output optical signals are received by the optical communication apparatuses 1a, 1b. Similarly, when the optical communication apparatus 1b transmits an optical signal, the transmitted optical signal is distributed by the optical coupler 3 and the distributed optical signals are received by the optical communication apparatuses 1a, 1b. When both the optical communication apparatuses 1a, 1b transmit optical signals, transmitted two optical signals are combined by the optical coupler 3. The combined optical signal is distributed by optical coupler 3. Then, the combined optical signal is output from respective optically outputting units 32, 32 and received by respective optical communication apparatuses 1a, 1b.

The optical communication apparatuses 1a, 1b transmit optical signals in which the presence/absence of light is utilized for corresponding to the digital data. The optical coupler 3 is configured to output light toward two optically outputting units 32, 32 when light is input into either of two optically inputting units 31, 31. Thus, it is possible to perform processing similar to the arbitration processing based on the CAN protocol, in the case that the presence/absence of light in the optical signal is associated with the dominant/recessive in the formatted data based on the CAN protocol.

The optical communication line 4 that connects the optically transmitting unit 15 included by the optical communication apparatus 1a with the optically inputting unit 31 included by the optical coupler 3 is preferred to have a length similar to a length of another optical communication line 4 that connects optically transmitting unit 15 included by the optical communication apparatus 1b with the optically inputting unit 31 included by the optical coupler 3, for preventing the lag between a timing when an optical signal transmitted by the optical communication apparatus 1a is input into the optical coupler 3 and a timing when an optical signal transmitted by another optical communication apparatus 1b is input into the optical coupler 3. However, based on the speed of optical communication, one optical communication line 4 may has the length different from the length of the other optical communication line 4.

Either of the optical communication apparatuses 1a, 1b included in the on-vehicle communication system makes the CAN controlling unit 12 convert data to be transmitted toward the other of the optical communication apparatuses 1a, 1b into transmission data based on a predetermined data format, makes the optically transmitting unit 15 in the optically communicating unit 13 convert the transmission data into optical signals, and transmits the optical signals. After (immediately after) the optical signals are transmitted, said either of the optical communication apparatuses 1a, 1b makes the optically receiving unit 14 receive the transmitted optical signals, converts the optical signals into reception data that are configured with electrical signals, and makes the CAN controlling unit 12 determine whether the reception data is identical to the transmission data or not. Thus, either of the optical communication apparatuses 1a, 1b can detect that the collision of optical signal transmission is caused by the other of the optical communication apparatuses 1a, 1b.

When the transmission data is identical to the reception data and then the collision is not caused, each of the optical communication apparatuses 1a, 1b can continue performing the transmission processing. When the collision is detected because the transmission data is not identical to the reception data, each of the optical communication apparatuses 1a, 1b having detected the collision stops performing the transmission processing and starts performing the reception processing for receiving data transmitted by the other of optical communication apparatuses 1a, 1b. Even in the case that the collision of optical signal is actually caused, the collision cannot be detected by each of optical communication apparatuses 1a, 1b transmitting higher priority data and thus, such an optical communication apparatus continues performing the transmission processing.

Figure 2:
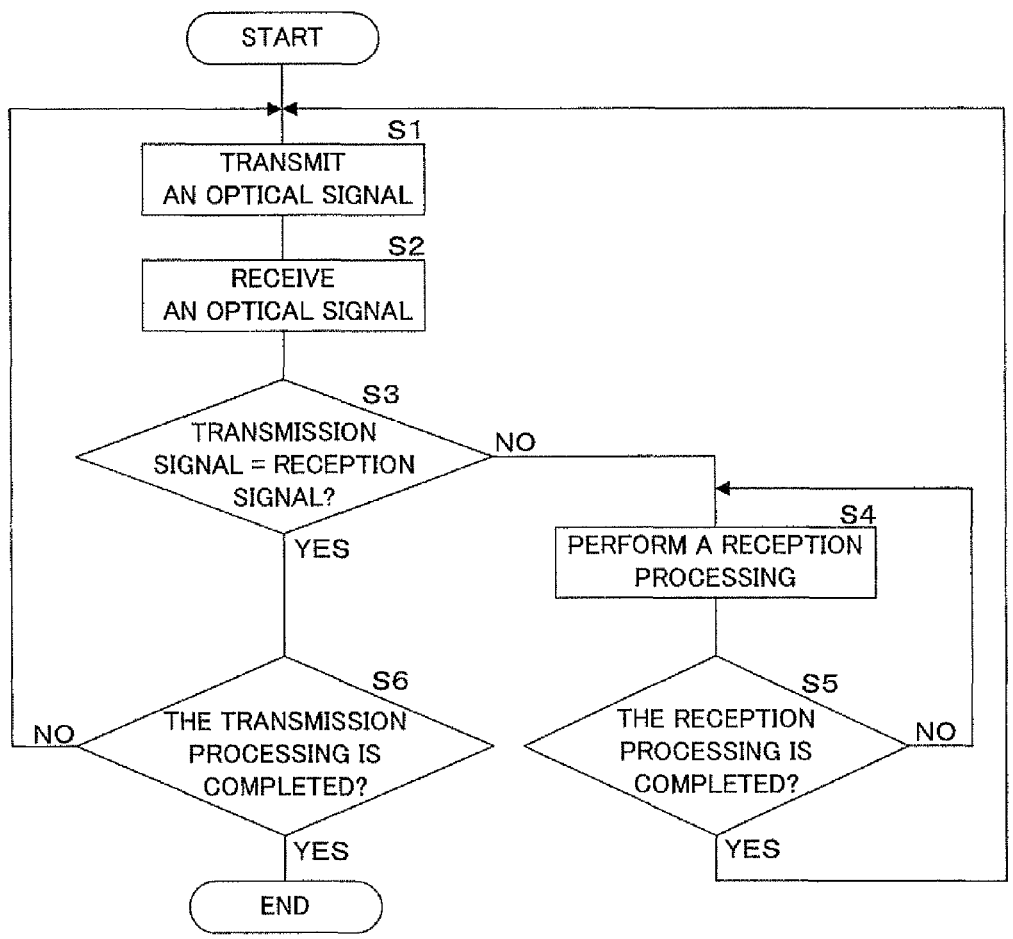
FIG. 2 is a flowchart showing a procedure of transmission processing performed by an optical communication apparatus included by the on-vehicle communication system according to the present invention.

FIG. 2 is a flowchart showing a procedure of transmission processing performed by optical communication apparatuses 1a, 1b included by the on-vehicle communication system according to the present invention. The CPU 11 included in either of the optical communication apparatuses 1a, 1b provides to the CAN controlling unit 12 with data to be transmitted toward the other of the optical communication apparatuses 1a, 1b, makes the CAN controlling unit 12 convert the data into transmission data based on a predetermined data format, makes the optically transmitting unit convert the transmission data into optical signals, and then outputs the optical signals, for performing the transmission processing of optical signals (step S1). After the optical signals are transmitted, said either of the optical communication apparatuses 1a, 1b makes the optically receiving unit 14 receive the optical signals (step S2), converts the received optical signals into reception data that are configured with electrical signals and provides the reception data to the CAN controlling unit 12.

Next, said either of the optical communication apparatuses 1a, 1b makes the CAN controlling unit 12 determine whether the optical signals (transmission signals) transmitted at the step S1 are identical to the optical signals (reception signals) received at the step S2 or not (step S3). When having determined that the transmission signals are not identical to the reception signals (S3: NO), said either of the optical communication apparatuses 1a, 1b detects that the transmission collision of optical signals is caused by said the other of the optical communication apparatuses 1a, 1b, stops performing the transmission processing, makes the CAN controlling unit 12 perform the reception processing for receiving optical signals transmitted by said the other of the optical communication apparatuses 1a, 1b (step S4), and determine whether the reception processing is completed or not (step S5). When having determined that the reception processing is not completed yet (S5: NO), said either of the optical communication apparatuses 1a, 1b returns the procedure to the step S4 and continues performing the reception processing. When having determined that the reception processing is completed (S5: YES), said either of the optical communication apparatuses 1a, 1b returns the procedure to the step S1 and re-starts performing the transmission processing.

When having determined that the transmission signals are identical to the reception signals (S3: YES), said either of the optical communication apparatuses 1a, 1b can continue performing the transmission processing because not detecting the collision of optical signal. Then, said either of the optical communication apparatuses 1a, 1b determines whether the transmission processing of optical signals regarding the transmission data is completed or not (step S6). When having determined that the transmission processing is not completed yet (S6: NO), said either of the optical communication apparatuses 1a, 1b returns the procedure to the step S1 and continues performing the transmission processing. When having determined that the transmission processing is completed (S6: YES), said either of the optical communication apparatuses 1a, 1b ends performing the transmission processing.

As described above, the on-vehicle communication system according to the embodiment 1 includes the optical coupler 3 that distributes input light, and the optical coupler 3 is connected through optical communication lines 4, 5 to the plural optical communication apparatuses 1a, 1b with the star topology in which the optical coupler 3 is arranged at the center. Each of optical communication apparatuses 1a, 1b makes own optically transmitting unit 15 input optical signals into the optically inputting unit 31 included by the optical coupler 3, makes own optically receiving unit 14 receive optical signals output from the optically outputting unit 32 included by the optical coupler 3, and performs the detection processing of transmission collision based on the reception signals. Therefore, it is possible to implement the optical communication that can prevent the effects caused by the ringing phenomenon, disturbance noise and the like. In addition, the on-vehicle communication system according to the embodiment 1 can perform the optical communication with a method similar to the method based on the CAN protocol utilized for the electrical communication. Thus, it is possible to utilize a unit similar to the unit included in a communication apparatus that performs the electrical communication, e.g., the CAN controlling unit 12 that is included in each of the communication apparatuses 1a, 1b. Hence, each of the optical communication apparatuses 1a, 1b can be implemented with a conventional communication apparatus provided with the optically communicating unit 13, because the conventional communication apparatus can perform the electrical communication. Therefore, it is possible to save the costs for developing the optical communication apparatuses 1a, 1b.

Furthermore, each of optical communication apparatuses 1a, 1b makes the optically receiving unit 14 receive optical signals, i.e., the reception signals, after making the optically transmitting unit 15 transmit optical signals, i.e., the transmission signals, determine whether the reception signals are identical to the transmission signals or not, and performs the collision detection processing based on the determination. When having detected that the collision is caused, each of optical communication apparatuses 1a, 1b stops performing the transmission processing of own optical signals and starts performing the reception processing of others' optical signals. Therefore, it is possible to perform the arbitration processing for the optical communication with the method based on the CAN protocol. Moreover, the length of optical communication line 4 that connects the optically transmitting unit 15 included by the optical communication apparatus 1a to the optically inputting unit 31 included by the optical coupler 3 can be configured to become substantially the same as the length of optical communication line 4 that connects the optically transmitting unit 15 included by the optical communication apparatus 1b to the optically inputting unit 31 included by the optical coupler 3. Therefore, it is possible to prevent the lag between the timing when the optical signals transmitted from the optical communication apparatus 1a are input into the optical coupler 3 and the timing when the optical signals transmitted from the optical communication apparatus 1b are input into the optical coupler 3, and to accurately perform processing, such as the communication collision detection processing and the arbitration processing.

This embodiment is explained in the context of on-vehicle communication system that utilizes the two-input/two-output optical couplers 3 to make two optical communication apparatuses 1a, 1b respectively perform the optical communication. However, the present invention is not limited to the context. It is possible to alternatively utilize an optical coupler that has more optically inputting/outputting units to make three or more optical communication apparatuses respectively perform the optical communication. In the alternative case, optical communication apparatuses can be connected through communication lines to each other with the star topology where the optical coupler is arranged at the center, and can perform the processing described above, such as the communication collision detection processing and the arbitration processing.

Embodiment 2

Figure 3:
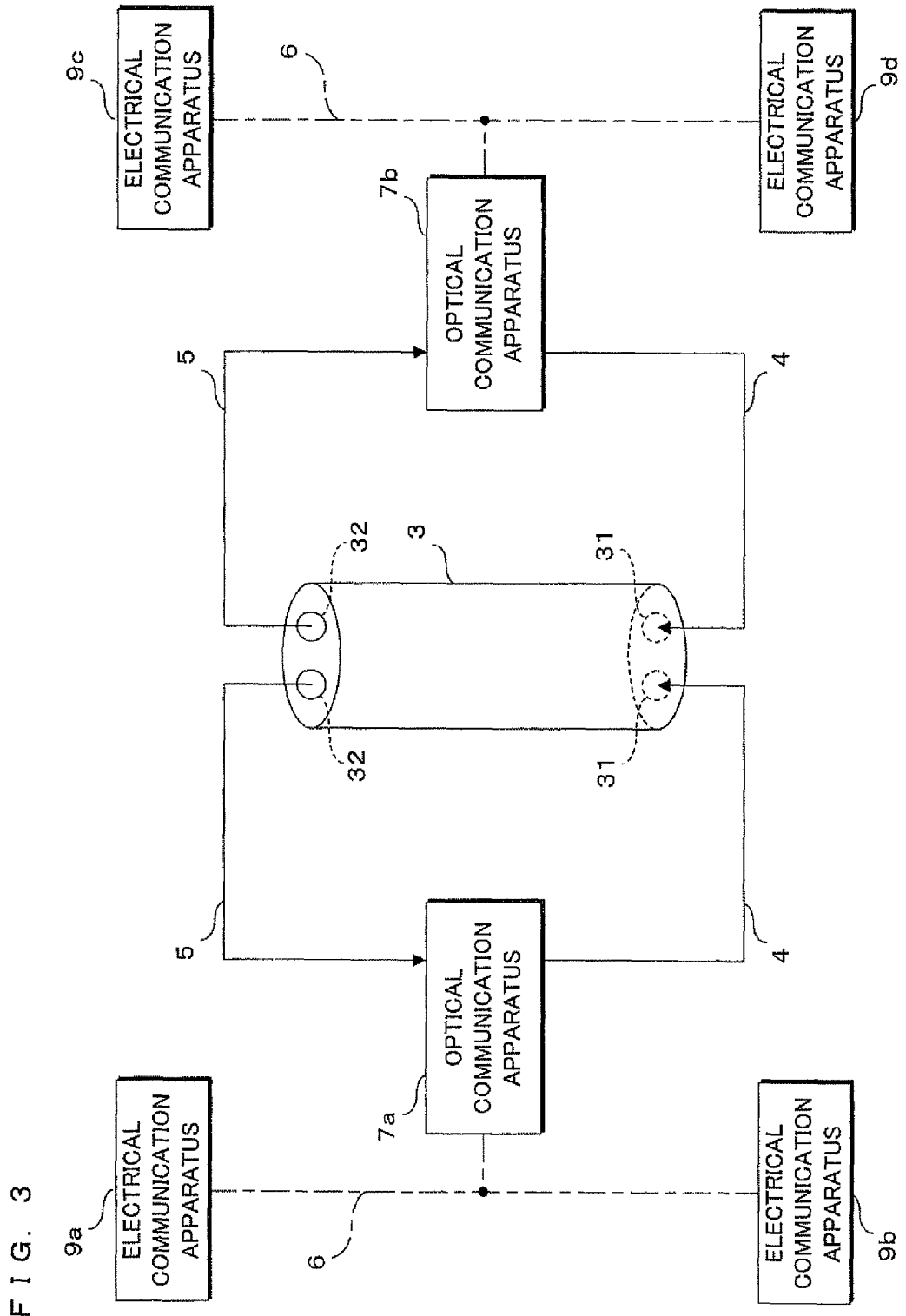
FIG. 3 is a block diagram showing a configuration of the on-vehicle communication system in an embodiment 2 according to the present invention.
Figure 4:
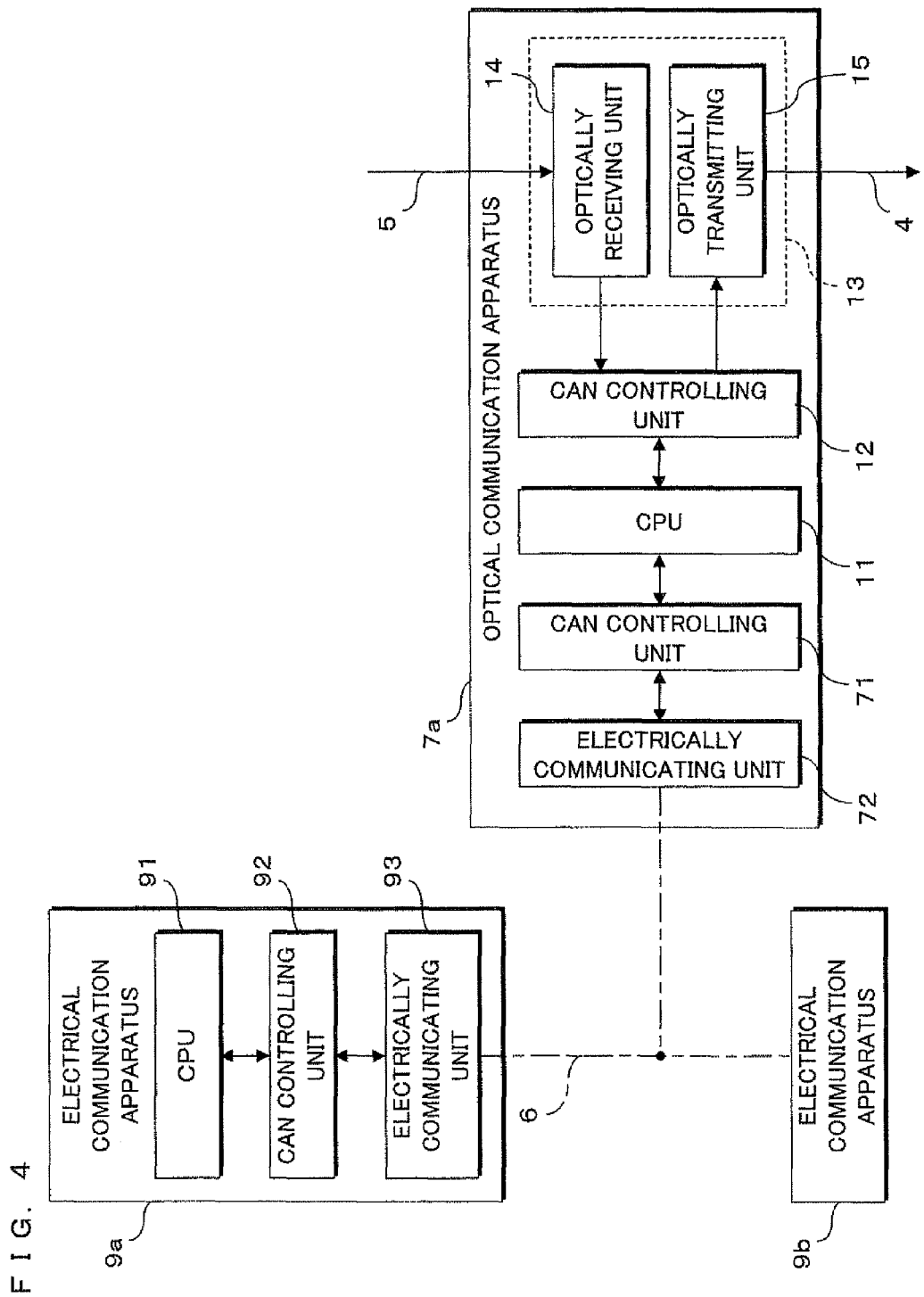
FIG. 4 is a block diagram showing a configuration of the on-vehicle communication system in the embodiment 2 according to the present invention.

FIG. 3 and FIG. 4 are block diagrams showing configurations of the on-vehicle communication system in an embodiment 2 according to the present invention. FIG. 3 illustrates an entire configuration of the on-vehicle communication system, and FIG. 4 illustrates a detailed configuration of each component included in the on-vehicle communication system. Although the on-vehicle communication system in the embodiment 1 described above is configured with optical communication apparatuses 1a, 1b that perform only the optical communication, the on-vehicle communication system in the embodiment 2 can perform not only the optical communication but also the electrical communication. The on-vehicle communication system in the embodiment 2 includes two optical communication apparatuses 7a, 7b and one optical coupler 3, similarly to the on-vehicle communication system in the embodiment 1, and further includes four electrical communication apparatuses 9a-9d. It should be noted that the optical communication apparatuses 7a, 7b included by the on-vehicle communication system in the embodiment 2 are configured to enable performing the optical communication through the optical communication lines 4, 5 and performing the electrical communication through a CAN bus 6.

The optical communication apparatus 7a included by the on-vehicle communication system in the embodiment 2 includes the optically transmitting unit 15 that is connected through the optical communication line 4 to a first optically inputting unit 31 included in the optical coupler 3, and includes the optically receiving unit 14 that is connected through the optical communication line 5 to a first optically outputting unit 31 included in the optical coupler 3. Similarly, the optical communication apparatus 7b includes the optically transmitting unit 15 that is connected through the optical communication line 4 to a second optically inputting unit 31 included in the optical coupler 3, and includes the optically receiving unit 14 that is connected through the optical communication line 5 to a second optically outputting unit 31 included in the optical coupler 3. In shorts, two optical communication apparatuses 7a, 7b are connected through optical communication lines 4, 5 to each other with the star topology where the optical coupler 3 is arranged at the center.

Each of the optical communication apparatuses 7a, 7b includes the CPU 11, CAN controlling unit 12 and optically communicating unit 13, similarly to each of the optical communication apparatuses 1a, 1b in the embodiment 1, and further includes a CAN controlling unit 71 and electrically communicating unit 72. The CAN controlling unit 71 performs processing similar to the processing performed by the CAN controlling unit 12. Thus, when data is provided by the CPU 11, the CAN controlling unit 71 converts the provided data into transmission data based on the data format that is utilized for the CAN protocol, and provides the transmission data to the electrically communicating unit 72 to perform data transmission. Furthermore, when the reception data is received by the electrically communicating unit 72, the CAN controlling unit 71 extracts desired data from the reception data and then provides the extracted data to the CPU 11. Therefore, the CPU 11 can utilize the CAN controlling unit 12 for performing the optical communication, and can utilize the CAN controlling unit 71 for performing the electrical communication. In addition, the CAN controlling unit 71 can perform processing based on the CAN protocol, such as the communication collision detection processing and the arbitration processing.

The electrically communicating unit 72 included in each of the optical communication apparatuses 7a, 7b is connected to the CAN bus 6. When the transmission data is provided by the CAN controlling unit 72, the electrically communicating unit 72 outputs the transmission data configured with the electrical signals toward the CAN bus 6, for transmitting the electrical signals to electrical communication apparatuses 9a-9d. In addition, the electrically communicating unit 72 detects the potential on the CAN bus 6 for receiving electrical signals, i.e., receiving the reception data, and provides the reception data to the CAN controlling unit 71. The CAN controlling unit 71 can determine whether the reception data is identical to the transmission data, and can perform the communication collision detection processing based on the determination results.

The on-vehicle communication system in the embodiment 2 is configured with the optical communication apparatus 7a that is connected to the electrical communication apparatuses 9a, 9b through the shared CAN bus 6 and able to perform the electrical communication based on the CAN protocol; and the optical communication apparatus 7b that is connected to the electrical communication apparatuses 9c, 9d through the other shared CAN bus 6 and able to perform the electrical communication based on the CAN protocol.

Each of the electrical communication apparatuses 9a-9d includes a CPU 91, CAN controlling unit 92, electrically communicating unit 93 and the like. It should be noted that the CPU 91, CAN controlling unit 92, and electrically communicating unit 93 included by each of the electrical communication apparatuses 9a-9d are configured similarly to the CPU 11, CAN controlling unit 71, and electrically communicating unit 72 included by each of the electrical communication apparatuses 7a, 7b. Therefore, the electrical communication apparatuses 9a-9d can perform the transmission processing of electrical signals through the CAN bus 6 and further perform the processing based on the CAN protocol, such as the communication collision detection processing and the arbitration processing.

It is possible to implement the optical communication and the electrical communication together in the on-vehicle communication system in the embodiment 2 described above, because each of the optical communication apparatuses 7a, 7b includes not only the function for performing the optical communication but also the function for performing the electrical communication. Therefore, it is possible to improve the versatility of on-vehicle communication system. Furthermore, it is possible to save the costs for developing the optical communication apparatuses 7a, 7b because both of the optical communication apparatuses 7a, 7b can utilize the communication method based on the CAN protocol for performing the optical communication and electrical communication. In addition, the electrical communication apparatuses 9a, 9b connected to one CAN bus 6 can be configured to communicate through the optical communication apparatuses 7a, 7b and optical coupler 3 with the electrical communication apparatuses 9c, 9d connected to the other CAN bus 6. Therefore, it is possible in this additional case to improve the versatility of on-vehicle communication system much better.

Although this embodiment is explained in the context of optical communication apparatuses 7a, 7b respectively connected to two of electrical communication apparatuses 9a-9d through the CAN bus 6, it should be noted that the present invention is not limited to the context. A desired number can be set as the number of electrical communication apparatuses 9a-9d connected to each CAN bus 6.

The configurations of other parts included by the on-vehicle communication system in the embodiment 2 are similar to those in the embodiment 1, thus are provided with the numerals same as those in the embodiment 1 and are not explained in detail.

Embodiment 3

In the on-vehicle communication systems in the embodiments 1 and 2 described above, single two-input/two-output optical coupler 3 is utilized for making two optical communication apparatuses 1a, 1b or 7a, 7b perform optical communication. On the other hand, the on-vehicle communication system in an embodiment 3 can make more optical communication apparatuses perform the optical communication.

Figure 5:
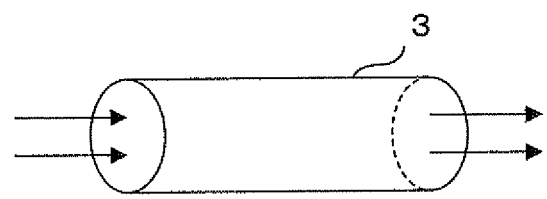
FIG. 5 is a schematic view showing an example configuration of an optical distribution device utilized for the on-vehicle communication system.
Figure 6:
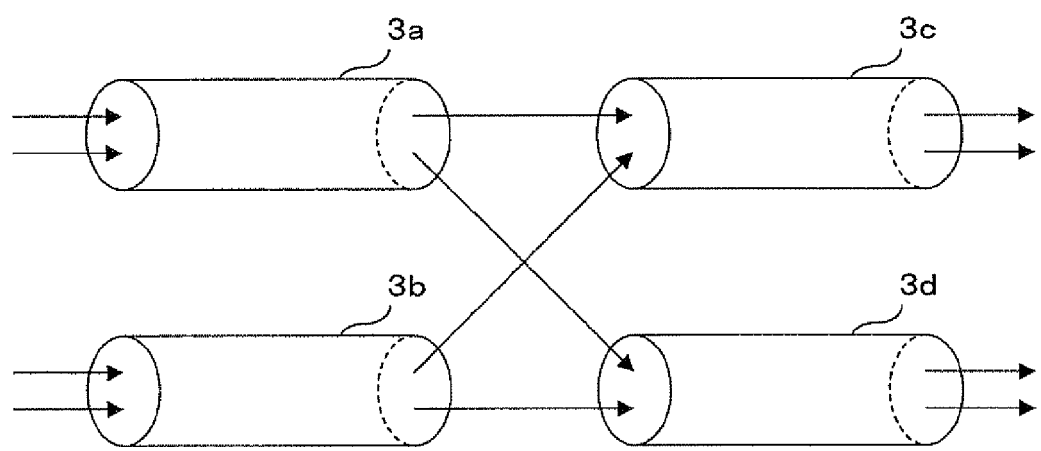
FIG. 6 is a schematic view showing another example configuration of the optical distribution device utilized for the on-vehicle communication system.
Figure 7:
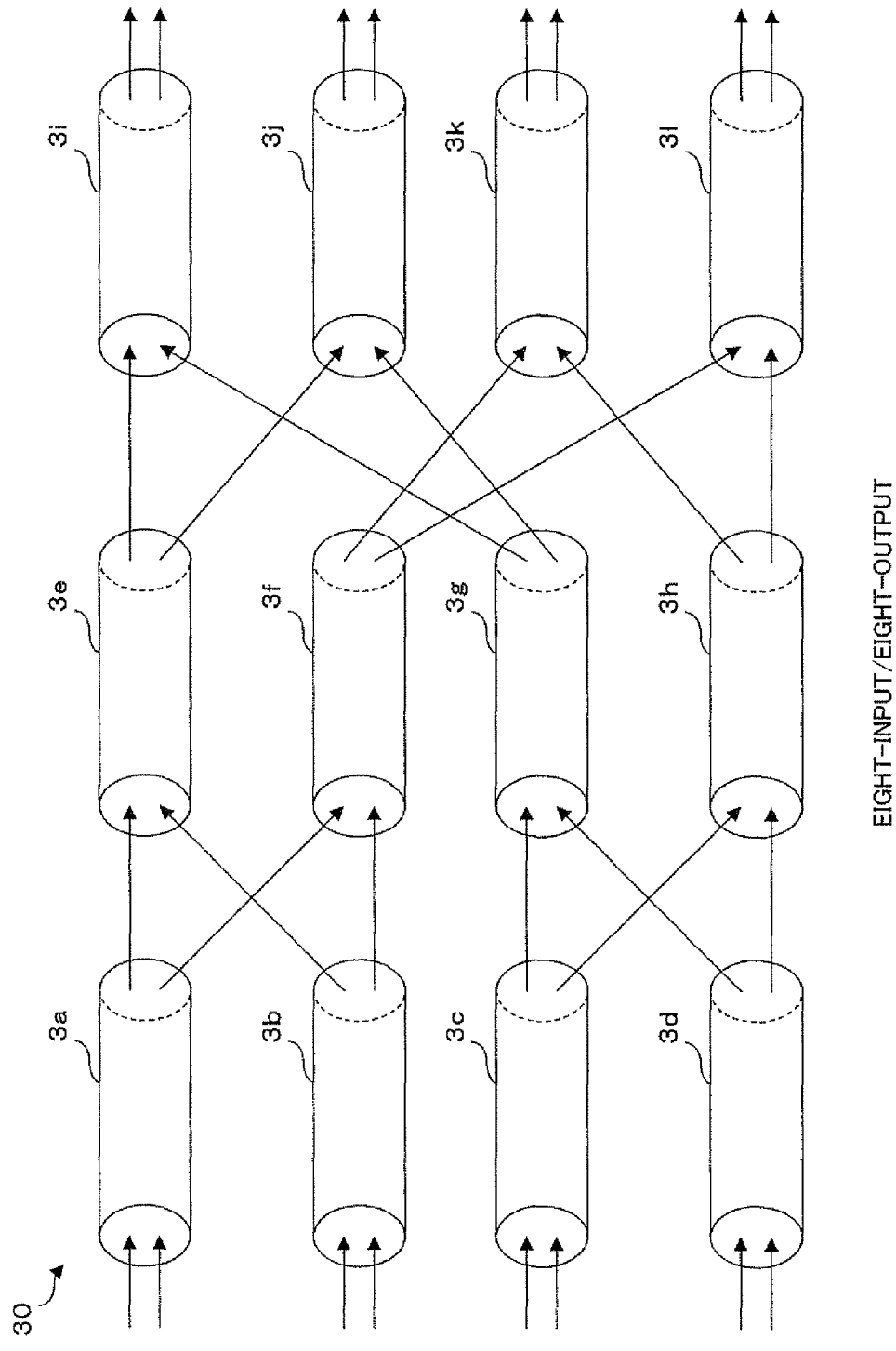
FIG. 7 is a schematic view showing another example configuration of the optical distribution device utilized for the on-vehicle communication system.

FIG. 5, FIG. 6 and FIG. 7 are schematic views showing example configurations of an optical distribution device utilized for the on-vehicle communication system. FIG. 5 illustrates the two-input/two-output optical couplers 3 utilized by the on-vehicle communication system in the embodiments 1 and 2, although arrows indicate input/output directions of optical signals and the optically inputting unit 31 and optically outputting unit 32 are not shown in FIG. 5. This single optical coupler 3 can make two optical communication apparatuses perform the optical communication, as described in the embodiments 1 and 2.

FIG. 6 illustrates an example of single four-input/four-output optical distribution device configured with four optical couplers 3a-3d. This optical distribution device includes 2 two-input/two-output optical couplers 3a, 3b at the front section (input section), and is able to input four optical signals output from the four optical communication apparatuses into the four optically inputting units 31, 31, . . . included by the optical couplers 3a, 3b, respectively. Furthermore, this optical distribution device includes 2 two-input/two-output optical couplers 3c, 3d at the back section (output section), two optically outputting unit 32, 32 included by the optical coupler 3a at the front section are respectively connected to optically inputting units 31, 31 included by two optical couplers 3c, 3d at the back section, two optically outputting units 32, 32 included by the optical coupler 3b at the front section are respectively connected to the optically inputting unit 31 included by two optical couplers 3c, 3d. Therefore, an optical signal input into one of the optically inputting units 31, 31, . . . included by the optical couplers 3a, 3b at the front section is output from all of the optically outputting units 32, 32, . . . included by the optical couplers 3c, 3d at the back section. When plural optical signals are input into optical couplers 3a, 3b at the front section, these optical signals are combined into one composite signal and the composite signal is output from all of the optically outputting units 32, 32, . . . included by the optical couplers 3c, 3d at the back section.

FIG. 7 illustrates an example of single eight-input/eight-output optical distribution device 30 configured with twelve optical couplers 3a-3l. This optical distribution device 30 includes 4 two-input/two-output optical couplers 3a-3d at the front section, 4 two-input/two-output optical couplers 3e-3h at the middle section, and 4 two-input/two-output optical couplers 3i-3l at the back section. Optical signals output from the optical coupler 3a, as well as the optical coupler 3b, at the front section are respectively input into not only the optical coupler 3e but also the optical coupler 3f at the middle section. In addition, optical signals output from the optical coupler 3c, as well as the optical coupler 3d, at the front section are respectively input into not only the optical coupler 3g but also the optical coupler 3h at the middle section. In other words, the optical couplers 3a, 3b, 3e, 3f configure a four-input/four-output optical distribution device as described in FIG. 6, and the optical couplers 3c, 3d, 3g, 3h configure another four-input/four-output optical distribution device as described in FIG. 6.

Optical signals output from the optical coupler 3e, as well as the optical coupler 3g, at the middle section of the optical distribution device 30 are respectively input into not only the optical coupler 3i but also the optical coupler 3j at the back section. In addition, optical signals output from the optical coupler 3f, as well as the optical coupler 3h, at the middle section are respectively input into not only the optical coupler 3k but also the optical coupler 3l at the back section. Therefore, an optical signal input into one of the optically inputting units 31, 31, . . . included by the optical couplers 3a-3d at the front section is output from all of the optically outputting units 32, 32, . . . included by the optical couplers 3i-3l at the back section. When plural optical signals are input into optical couplers 3a-3d at the front section, these optical signals are combined into one composite signal and the composite signal is output from all of the optically outputting units 32, 32, . . . included by the optical couplers 3i-3l at the back section.

Figure 8:
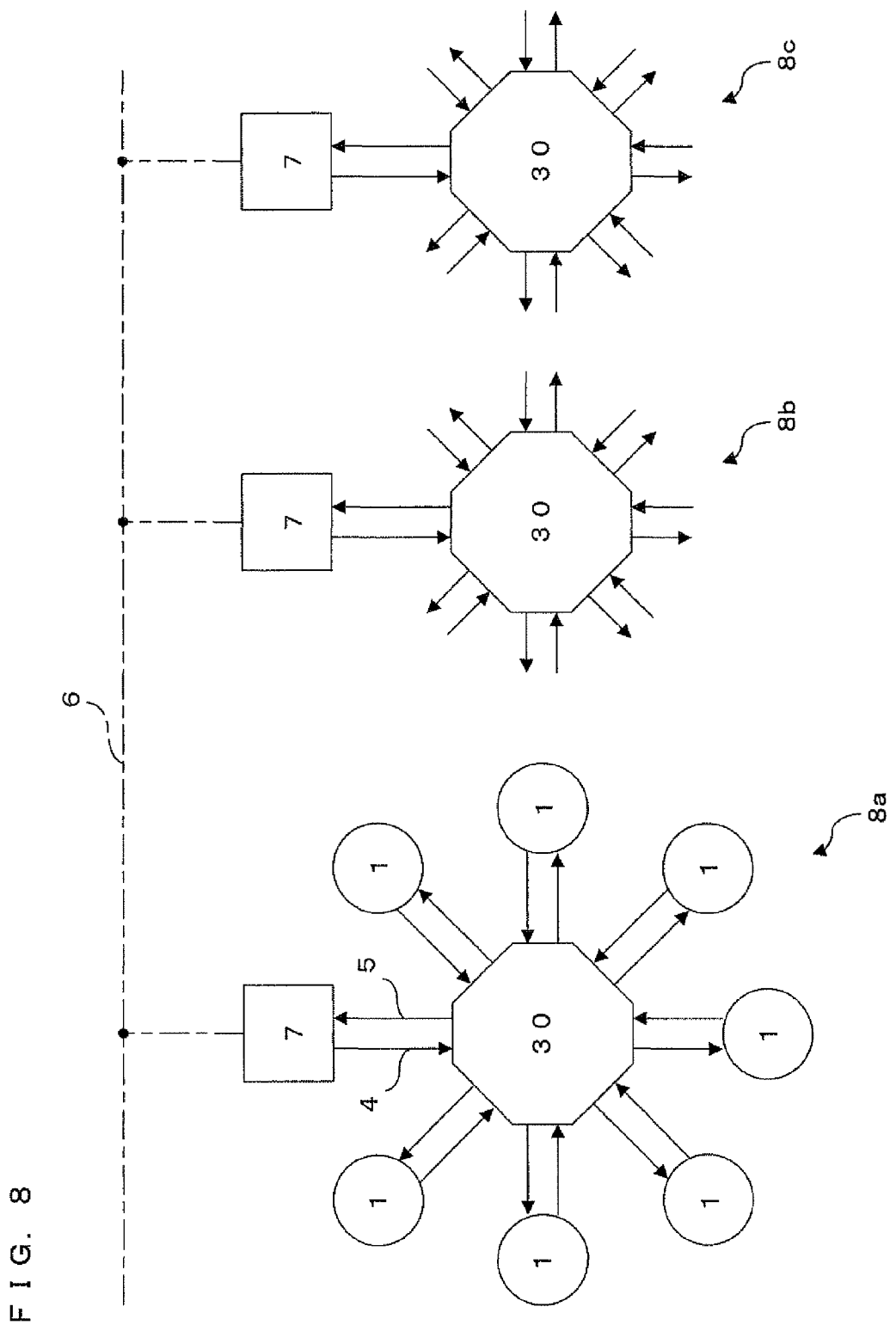
FIG. 8 is a block diagram showing the configuration of the on-vehicle communication system in an embodiment 3 according to the present invention.

FIG. 8 is a block diagram showing the configuration of the on-vehicle communication system in the embodiment 3 according to the present invention. The on-vehicle communication system in the embodiment 3 includes 3 eight-input/eight-output optical distribution devices 30, 30, . . . , each of which is shown in FIG. 7. Each optical distribution device 30 is connected with the star topology through the optical communication lines 4, 4, . . . , 5, 5, . . . to seven optical communication apparatuses 1, 1, . . . and one opto-electric conversion apparatus 7, to configure one of star networks 8a-8c. In FIG. 8, the eight-input/eight-output optical distribution device 30 is represented by an octagonal symbol, the optical communication apparatus 1 is represented by a circular symbol and the opto-electric conversion apparatus 7 is represented by a square symbol. Although the optical communication apparatus 1 is not shown for the star networks 8b, 8c in FIG. 8, seven optical communication apparatuses 1, 1, . . . are connected to the optical distribution device 30 for the star network 8b, as well as the star network 8c.

The optical communication apparatus 1 is configured similarly to the optical communication apparatuses 1a, 1b in the embodiment 1, includes the optically transmitting unit 15 connected through the optical communication line 4 to one of optically inputting units 31, 31, . . . that are included by the optical couplers 3a-3d configuring the optical distribution device 30, and further includes the optically receiving unit 14 connected through the optical communication line 5 to one of optically outputting units 32, 32, . . . that are included by the optical couplers 3i-3l configuring the optical distribution device 30. Therefore, the optical communication apparatus 1 can perform the optical communication based on the CAN protocol with another optical communication apparatus 1 and the opto-electric conversion apparatus 7 in the same network of star networks 8a-8c. In other words, the optical communication apparatus 1 is connected to one optical distribution device 30 and can perform the optical communication based on the CAN protocol with the apparatuses connected to the same optical distribution device 30.

The opto-electric conversion apparatus 7 is configured similarly to the optical communication apparatuses 7a, 7b in the embodiment 2, and includes the function for performing the optical communication and the function for performing the electrical communication. The opto-electric conversion apparatus 7 includes the optically transmitting unit 15 connected through the optical communication line 4 to one of the optically inputting units 31, 31, . . . included by the optical distribution device 30, further includes the optically receiving unit 14 connected through the optical communication line 5 to one of the optically outputting units 32, 32, . . . included by the optical distribution device 30 and is connected through the CAN bus 6 to another opto-electric conversion apparatuses 7 included in another of star networks 8a-8c. Therefore, the opto-electric conversion apparatus 7 included in one of the star networks 8a-8c can perform the optical communication with the optical communication apparatus 1 included in the same one of the star networks 8a-8c, and can perform the electrical communication with another opto-electric conversion apparatus 7 through the CAN bus 6.

When the opto-electric conversion apparatus 7 performs the optical communication and receives an optical signal from an optical communication apparatus 1 included in the same one of the star networks 8a-8c, the opto-electric conversion apparatus 7 makes the optically communicating unit 13 convert the received optical signal into the electrical signal and makes the electrically communicating unit 72 output the converted electrical signal toward the CAN bus 6, for transmitting the converted electrical signal to another opto-electric conversion apparatus 7 included in another of star networks 8a-8c. When the opto-electric conversion apparatus 7 receives an electrical signal from another opto-electric conversion apparatus 7, the opto-electric conversion apparatus 7 makes the optically communicating unit 13 convert the received electrical signal into the optical signal and outputs the converted optical signal toward the optical communication line 4, for transmitting the converted optical signal to an optical communication apparatus 1 included in the same one of star networks 8a-8c. In shorts, the opto-electric conversion apparatus 7 can mediate between the electrical communication and the optical communication.

For example, an optical signal transmitted by an optical communication apparatus 1 in the star network 8a is received by another optical communication apparatus 1 and the opto-electric conversion apparatus 7 that are located in the same star network 8a, is converted into the electrical signal by the opto-electric conversion apparatus 7. Then, the opto-electric conversion apparatus 7 transmits the converted electrical signal to another opto-electric conversion apparatus 7 located in another of star networks 8b, 8c and converted into the optical signal by said another opto-electric conversion apparatus 7 that receives the transmitted electrical signal and is located in said another of star networks 8b, 8c. Then, said another opto-electric conversion apparatus 7 transmits the converted optical signal to an optical communication apparatus 1 located in said another of star networks 8b, 8c. In shorts, each optical communication apparatus 1 can perform data transmission with all of the other optical communication apparatuses included in the on-vehicle communication system.

Figure 9:
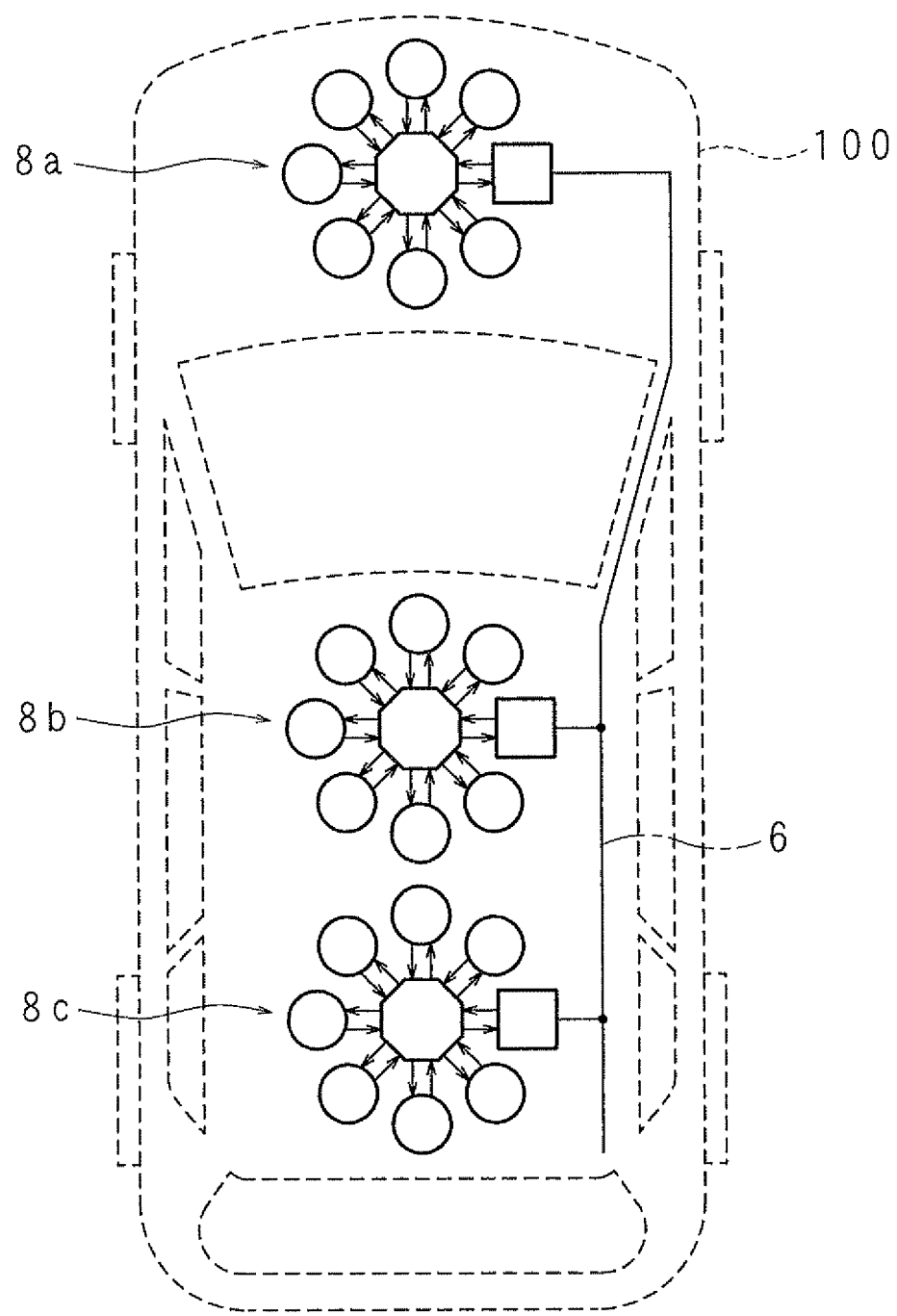
FIG. 9 is a schematic view showing an example case that the on-vehicle communication system in the embodiment 3 is mounted on a car.

FIG. 9 is a schematic view showing an example case that the on-vehicle communication system in the embodiment 3 is mounted on a car 100. In the example shown by FIG. 9, the car 100 is provide with the star network 8a at the front portion, with the star network 8b at the center portion and with the star network 8c at the back portion. Each of star networks 8a-8c includes the opto-electric conversion apparatus 7 that is connected to the others of star networks 8a-8c through the CAN bus 6 arranged along the body of the car 100. Thus, three star networks 8a-8c can mutually perform the transmission of electrical signals.

For example, it is required to arrange many electronic apparatuses tightly within a narrow area of the engine room at the front portion of the car 100. When the optical communication function is provided to these electronic apparatuses for making each of these electronic apparatuses become the optical communication apparatus 1, the star network 8a can be made with these optical communication apparatuses 1, 1, . . . that are connected through the optical communication lines 4, 5 to each other with the optical distribution device 30 arranged at the center. Therefore, it is possible to prevent the effects caused by the ringing phenomenon, disturbance noise and the like from affecting the optical communication between the optical communication apparatuses 1, 1, . . . located in the star network 8a, and to implement the accurate communication. Similarly, it is possible to prevent the effects caused by the ringing phenomenon, disturbance noise and the like from affecting the optical communication between the optical communication apparatuses 1, 1, . . . located in the star network 8b, as well as the star network 8c, too.

In addition, it is preferred to utilize the electrical communication line for performing the communication between electronic apparatuses separated relatively far to each other in the car 100 because the communication line connecting these electronic apparatuses is likely to be bent. The star networks 8a-8c are respectively arranged at the front portion, center portion and back portion of the car 100, i.e., separated relatively far to each other. Thus, the star networks 8a-8c are connected with the CAN bus 6 to each other, and perform the electrical communication with own opto-electric conversion apparatus 7. Therefore, it is possible to simplify the arrangement of communication lines on the car 100.

As described above, it is preferred to make the on-vehicle communication system in the embodiment 3 arrange the star networks 8a-8c, which perform the optical communication with the optical distribution device 30 arranged at the center, at the area where the distance between electronic apparatuses is relatively shorter, but make the on-vehicle communication system in the embodiment 3 perform the electrical communication through the CAN bus 6 at the area where the distance between electronic apparatuses is relatively longer.

As described above, the on-vehicle communication system in the embodiment 3 is configured with the star networks 8a-8c, each of which is configured with the optical communication apparatus 1 and opto-electric conversion apparatus 7 that are connected to each other with the optical distribution device 30 arranged at the center. Furthermore, the opto-electric conversion apparatuses 7, 7, . . . included in the star networks 8a-8c are connected to each other through the CAN bus 6. Therefore, it is possible to implement the on-vehicle communication system that can perform both the optical communication and electrical communication, and to improve the versatility of on-vehicle communication system. In addition, the on-vehicle communication system in the embodiment 3 can be made to perform the optical communication at the area where many electronic apparatuses are arranged tightly, i.e., the distance between the electronic apparatuses is relatively shorter, and to perform the electrical communication at the area where the distance between the electronic apparatuses is relatively longer. Therefore, it is possible to simplify the arrangement of communication lines on the car 100 and to prevent the effects caused by the ringing phenomenon, disturbance noise and the like at the area where many electronic apparatuses are arranged tightly. In addition, the eight-input/eight-output optical distribution device 30 is configured with plural two-input/two-output optical couplers 3a-31. Therefore, it is possible to save the costs for implementing the optical distribution device 30 provided with many input/output units, and to save the costs for implementing the on-vehicle communication system.

This embodiment is explained in the context of the on-vehicle communication system configured with three star networks 8a-8c. However, the present invention is not limited to the context. The on-vehicle communication system may be configured with one, two, four or more star networks. In addition, this embodiment is explained in the context of star networks 8a-8c, each of which includes seven optical communication apparatuses 1, 1, . . . . However, the present invention is not limited to the context. The star network may include less than seven optical communication apparatuses 1, 1, . . . or include more than seven optical communication apparatuses 1, 1, . . . with utilizing the optical distribution device including more input/output units.

The configurations of other parts included by the on-vehicle communication system in the embodiment 3 are similar to those in the embodiments 1 and 2, thus are provided with the numerals same as those in the embodiments 1 and 2 and are not explained in detail.

Embodiment 4

Figure 10:
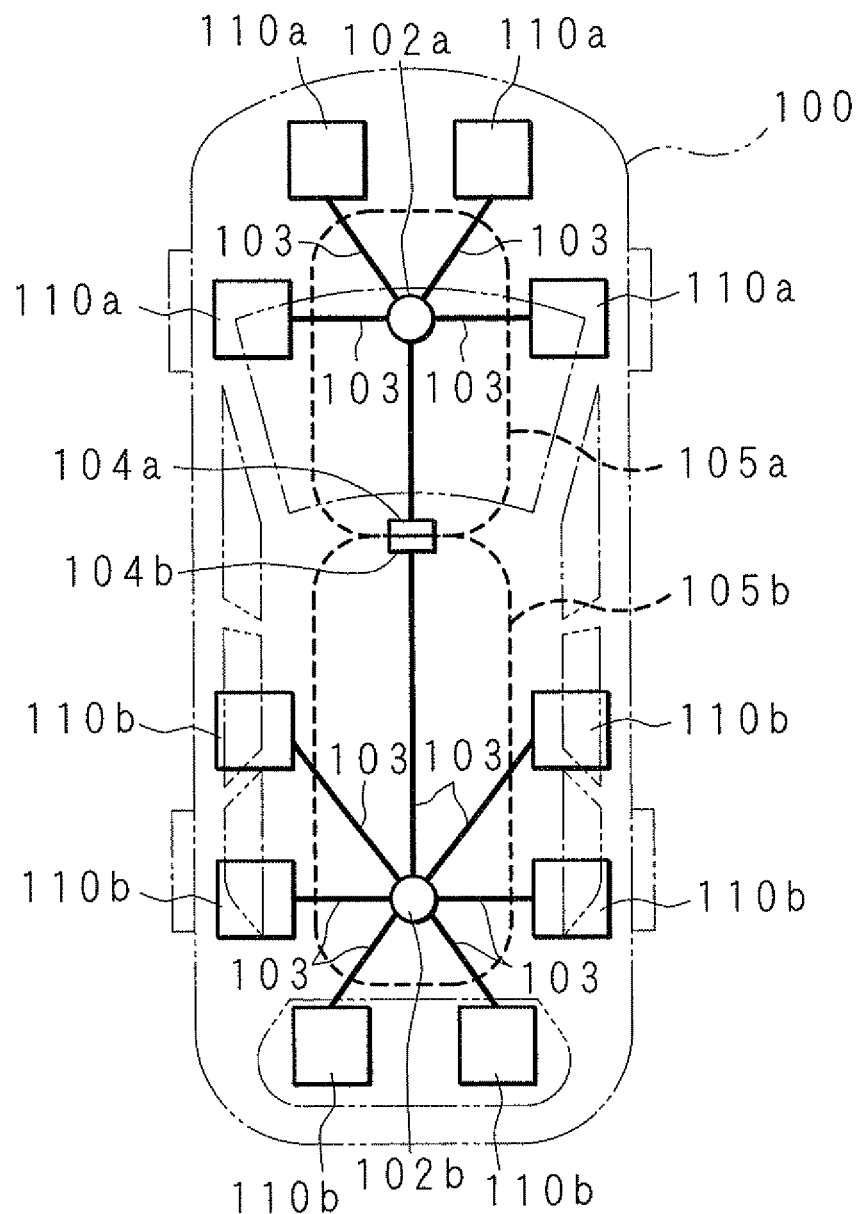
FIG. 10 is a block diagram showing a configuration of an on-vehicle optical communication system in an embodiment 4.

FIG. 10 is a block diagram showing a configuration of the on-vehicle optical communication system in an embodiment 4. The on-vehicle optical communication system is mounted on the car 100 and includes plural optical communication apparatuses 110a, 110a, . . . , 110b, 110b, . . . , optical distribution devices 102a, 102b, optical communication lines 103, 103, . . . , and connectors 104a, 104b. An optical communication harness 105a is configured with the optical distribution device 102a, optical communication line 103 and connector 104a. Similarly, an optical communication harness 105b is configured with the optical distribution device 102b, optical communication line 103 and connector 104b.

Plural optical communication apparatuses 110a, 110a, . . . are connected to the optical distribution device 102a through optical communication lines 103, 103, . . . with the star topology. Similarly, plural optical communication apparatuses 110b, 110b, . . . are connected to the optical distribution device 102b through optical communication lines 103, 103, . . . with the star topology.

The optical distribution device 102a is connected to the connector 104a through the optical communication line 103. The optical distribution device 102b is connected to the connector 104b through the optical communication line 103. The connector 104a is connected to the connector 104b, and thus the optical distribution device 102a is connected to the optical distribution device 102b.

The optical communication line 103 is an optical fiber. The up line from the optical communication apparatus 110a to the optical distribution device 102a is distinguished from the down line from the optical distribution device 102a to the optical communication apparatus 110a. Similarly, the up line from the optical communication apparatus 110b to the optical distribution device 102b is distinguished from the down line from the optical distribution device 102b to the optical communication apparatus 110b. Similarly, in the optical communication line 103 between the optical distribution device 102a and the optical distribution device 102b, the line from the optical distribution device 102a to the optical distribution device 102b is distinguished from the line from the optical distribution device 102b to the optical distribution device 102a.

Figure 11:
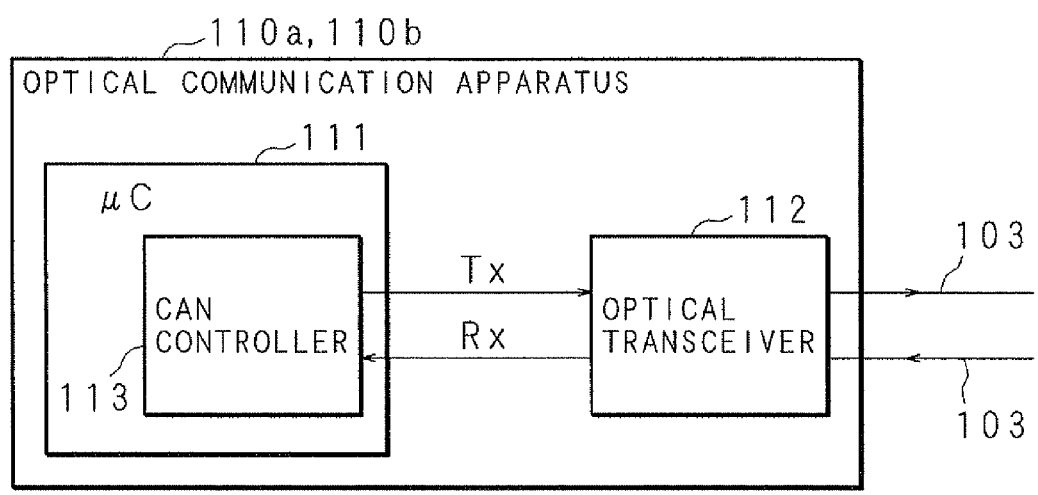
FIG. 11 is a block diagram showing the configuration of the optical communication apparatus in the embodiment 4.

FIG. 11 is a block diagram showing the configuration of the optical communication apparatus 110a (Hob) in the embodiment 4. The optical communication apparatus 110a includes a microcomputer (represented by the "μC" in FIG. 11) 111 and optical transceiver 112. The optical communication apparatus 110a is an ECU that controls each component arranged on the car. Although the wavelength of optical signal transmitted by the optical transceiver is different in the optical communication apparatus 110a and optical communication apparatus 110b, the other configurations are similar in both. Thus, it is not described in detail about inner configurations of the optical communication apparatus 110b.

The microcomputer 111 makes a processor, such as a central processing unit (CPU) and micro processing unit (MPU), read out a program stored in a read only memory (ROM), to control on-vehicle components (not shown). The microcomputer 111 includes the functions implemented by the CAN controller 113. Thus, the microcomputer 111 can perform data transmission based on the CAN protocol and can control in accordance with the received data.

In accordance with the indication provided by the processor included in the microcomputer 111, the CAN controller 113 generates a transmission signal Tx that is converted into the transmission data based on the data format which is utilized for the CAN protocol, and outputs the transmission signal Tx to the optical transceiver 112. In addition, when a reception signal Rx is input from the optical transceiver 112, the CAN controller 113 interprets the reception signal Rx based on the CAN protocol and notifies the interpretation results to the processor. While continuously outputting one bit of the transmission signal Tx at a time, the CAN controller 113 performs the input processing of the reception signal Rx and compares the arbitration field of the reception signal Rx described later and the arbitration field of own transmission signal Tx. When the arbitration field of the transmission signal Tx is identical to the arbitration field of the reception signal Rx, the CAN controller 113 continues outputting the transmission signal Tx. When the arbitration field of the transmission signal Tx is not identical to the arbitration field of the reception signal Rx, the CAN controller 113 stops outputting the transmission signal Tx and performs processing in the reception mode. Therefore, it is possible to perform the arbitration processing when signals are simultaneously transmitted from plural optical communication apparatuses 110a, 110a, . . . (or optical communication apparatuses 110b, 110b, . . . ).

The signal transmitted in accordance with the CAN protocol is the digital signal configured with plural fields, such as the arbitration field, control field, data field, cyclic redundancy check (CRC) field and acknowledgement (ACK) field. When data is provided from the processor included by the microcomputer 111, the provided data is stored in the data field. The arbitration field is for performing the arbitration processing described above when the communication collision occurs, and stores values corresponding to the priority of signal. The transmitting CAN controller 113 checks whether the ACK bit is included in the ACK field of the transmitted signal or not, to determine whether the transmitted signal is received or not, and further to determine whether the transmitted signal should be transmitted again or not. In the CAN protocol, the digital signal "0 (dominant)" is given the higher priority than the digital signal "1 (recessive)".

When the transmission signal Tx is generated in accordance with the CAN protocol by the CAN controller 113, the optical transceiver 112 converts the transmission signal Tx into the optical signal and transmits the converted optical signal to the optical communication line 103. The optical transceiver 112 converts the "0 (dominant)" based on the CAN protocol into the "presence" of light, and the "1 (recessive)" based on the CAN protocol into the "absence" of light. On the contrary, when receiving the signal through the optical communication line 103, the optical transceiver 112 converts the "presence" of the received signal (i.e., light) into the "0 (dominant)" and the "absence" of the received signal (i.e., light) into the "1 (recessive)" to generate the reception signal Rx that is the digital signal. Then, the optical transceiver 112 outputs the reception signal Rx to the CAN controller 113.

The wavelength of optical signal transmitted by the optical transceiver 112 included in the optical communication apparatus 110a is different from the wavelength of optical signal transmitted by the optical transceiver 112 included in the optical communication apparatus 110b. For example, the optical transceiver 112 included by the optical communication apparatus 110a utilizes the optical signal whose wavelength is 650 nm for performing signal transmission based on the CAN protocol. The optical transceiver 112 included by the optical communication apparatus 110a can properly receive both the optical signal whose wavelength is 550 nm and the optical signal whose wavelength is 650 nm, convert the received optical signal into the digital signal, and provide the converted digital signal to the CAN controller 113. However, the optical transceiver 112 included by the optical communication apparatus 110a neglects an optical signal, whose wavelength is 650 nm but whose power is lower than a predetermined level.

On the contrary, the optical transceiver 112 included by the optical communication apparatus 110b utilizes the optical signal, for example, whose wave length is 550 nm. The wavelength of optical signal utilized by the optical transceiver 112 included in the optical communication apparatus 110b is preferred to be longer or shorter, by not less than 50-100 nm, than the wavelength of optical signal utilized by the optical transceiver 112 included in the optical communication apparatus 110a. The communication apparatus 110b is configured similarly to the communication apparatus 110a, except for the wavelength of optical signal transmitted by itself. Thus, the communication apparatus 110b also properly receives both the optical signal whose wavelength is 550 nm and the optical signal whose wavelength is 650 nm, but neglects an optical signal whose wavelength is 550 nm but whose power is lower than a predetermined level.

Figure 12:
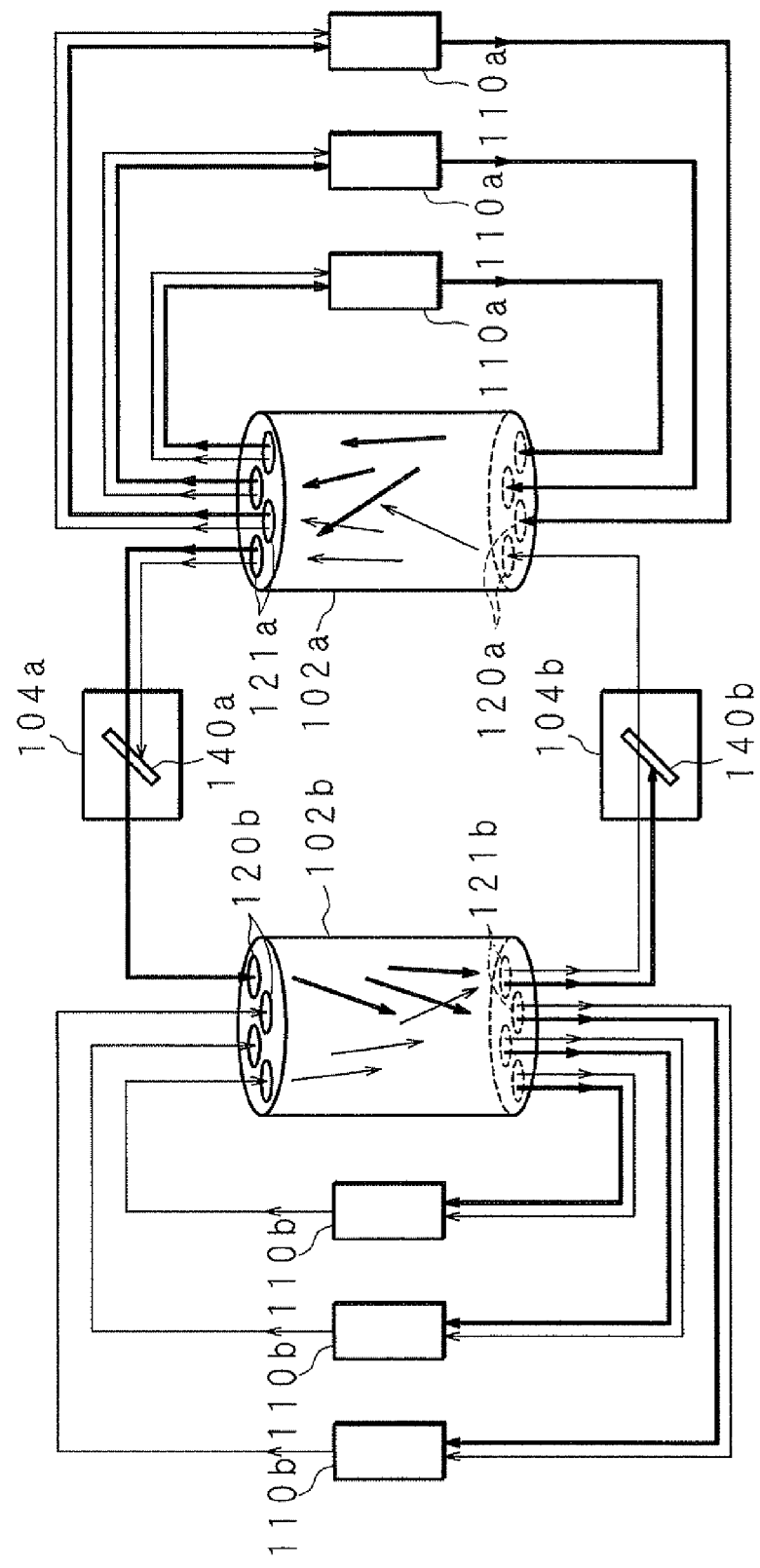
FIG. 12 is a schematic view showing configurations of the optical distribution device and a connector in the embodiment 4 and transmission processing of optical signals through the optical distribution device and connector in the embodiment 4.

FIG. 12 is a schematic view showing configurations of the optical distribution devices 102a, 102b, and connectors 104a, 104b in the embodiment 4 and transmission processing of optical signals through the optical distribution devices 102a, 102b and connectors 104a, 104b in the embodiment 4. As the optical distribution device 102b is configured similarly to the optical distribution device 102a, it is described below about the optical distribution device 102a but not in detail about the optical distribution device 102b.

For the explanation purpose, the explanation of FIG. 12 described below is based on the context of the optical distribution device 102a that includes four optically inputting units 120a, 120a, . . . and four optically outputting units 121a, 121a, . . . and is connected with three optical communication apparatuses 110a, 110a, . . . . Of course, the optical communication apparatus 110a may alternatively include more than four optically inputting units 120a, 120a, . . . and more than four optically outputting units 121a, 121a, . . . . In addition, the optical communication apparatus 110a may be connected to more than three optical communication apparatuses 110a, 110a, . . . .

The optical distribution device 102a includes four optically inputting units 120a, 120a, . . . at the one side, and four optically outputting units 121a, 121a, . . . as the other side. The optically inputting unit 120a is a guide directing the optical signal input from the optical communication line 103, and the optically outputting unit 121a is a guide directing the light propagated inside the optical distribution device 102a toward the optical communication line 103 connected to the optically outputting unit 121a. The optically outputting unit 121a may further include a light receiving element for receiving the light and may output the light to the optical communication line 130. Thus, when the light is input into one optically inputting unit 120a, the input light is output from all of the four optically outputting units 121a, 121a, . . . .

The optical distribution device 102a is configured with 4 two-input/two-output optical couplers that are relatively inexpensive. Among the four optical couplers, two optical couplers are arranged at the front section (input section) and the remaining two optical couplers are arranged at the back section (output section). Two outputting units included in each of two optical couplers at the front section are connected to two optical couplers at the back section, respectively. Thus, when the light is input into one of inputting units included in the two optical couplers at the front section, the input light is output toward the two optical couplers at the back section and is output from all of the two outputting units included in each of two optical couplers at the back section. The optical distribution device 102a is formed in a cylindrical or prismatic shape made of transparent material, such as transparent resin and glass. When light is input into one optically inputting unit 120a, the input light may propagate the inside and may be output from all of the four optically outputting units.

Seven optical communication apparatuses 110a, 110a, ... and one optical distribution device 102b can be connected to the optical distribution device 102a, in the case that optical distribution device 102a includes eight optically inputting units 120a, 120a, ... and eight optically outputting units 121a, 121a, .... In this case that optical distribution device 102a includes eight optically inputting units 120a, 120a, ... and eight optically outputting units 121a, 121a, ..., the optical distribution device 102a can be configured with 12 two-input/two-output optical couplers that are inexpensive. In other words, the optical distribution device 102a can be configured with four optical couplers arranged at the front section (input section), four optical couplers arranged at the middle section and four optical couplers arranged at the back section (output section), wherein each of two inputting units included in each optical coupler are separated and connected and each of two outputting units in each optical coupler are separated and connected.

Figure 13:
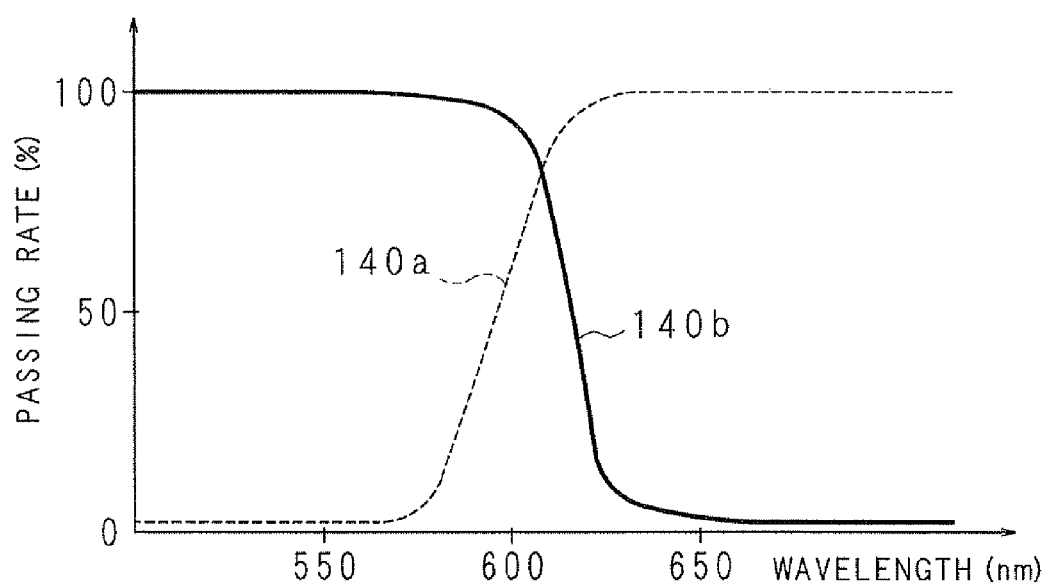
FIG. 13 is a graph showing a characteristic of a filter in the embodiment 4.

As connected to the optical communication line 103, each of the connector 104a and connector 104b guide the optical signal propagated in the connected optical communication line 103 and directs the optical signal to another optical communication line 103. The connector 104a includes a filter 140a at the inside, and the connector 104b includes a filter 140b at the inside. The filter 140a is an optical filter (high path filter: HPF), and the filter 140b is another optical filter (low path filter: LPF). FIG. 13 is a graph showing characteristics of the filters 140a, 140b in the embodiment 4. For example, the filter 140a passes the optical signal whose wavelength is 650 nm but attenuates the optical signal whose wavelength is 550 nm, among the optical signals propagated inside the optical communication line 103. For example, the filter 140b passes the optical signal whose wavelength is 550 nm but attenuates the optical signal whose wavelength is 650 nm.

Even when all the communications in the on-vehicle optical communication system are implemented with the optical communication similarly to the embodiment 1, the configurations described above can make the optical communication apparatus 110a and optical communication apparatus 110b respectively perform communication processing based the CAN protocol. Next, detailed configurations are described in reference to FIG. 12, again.

The optical communication apparatus 110a transmits a data signal for allowing data obtained through own processing by itself to be utilized by another optical communication apparatus 110a or optical communication apparatus 110b. As transmitted, the data signal is an optical signal whose wavelength is 650 nm. The transmitted optical signal is input into one optically inputting unit 120a included in the optical distribution device 102a that is connected to the optical communication apparatus 110a through the optical communication line 103.

When an optical signal is input into one optically inputting unit 120a included in the optical distribution device 102a, the optical distribution device 102a outputs the input optical signal from all of four optically outputting units 121a, 121a, .... Three of four optically outputting units 121a, 121a, are connected to three optical communication apparatuses 110a, 110a, ... including the transmission source optical communication apparatus 110a that has transmitted the optical signal. Thus, these three optical communication apparatuses 110a, 110a, ... can receive the data signal transmitted from the transmission source. Hence, the transmission source optical communication apparatus 110a can make the CAN controller 113 compare the arbitration field in the data signal being output from the transmission source optical communication apparatus 110a and the arbitration field in the input reception signal. Therefore, it is possible to implement the communication based on the CAN protocol.

The other one of four optically inputting unit 121a included in the optical distribution device 102a is connected to another optical distribution device 102b via the connector 104a interiorly including the filter 140a. Because the filter 140a passes 100% of light whose wavelength is 650 nm, i.e., the filter 140a passes 100% of the optical signal transmitted from the optical communication apparatus 110a, the optical signal transmitted from one optically inputting unit 121a reaches to the distribution device 102b, too.

When an optical signal is input into one optically inputting unit 120b included in the optical distribution device 102b, the optical distribution device 102b similarly outputs the input optical signal from all of the four optically outputting units 121b, 121b, .... Three of four optically outputting units 121b, 121b, ... are respectively connected to three optical communication apparatuses 110b, 110b, ... through the optical communication lines 103, 103, .... Because the optical communication apparatus 110b can receive the optical signals output from these three optically outputting units 121b, 121b, ..., regardless of the wavelength of output optical signals, the optical communication apparatus 110b can receive the optical signal transmitted from the optical communication apparatus 110a. Therefore, the optical communication apparatus 110b can also receive the light transmitted from the optical communication apparatus 110a.

The other one of four optically outputting units 121b, 121b, included in the optical distribution device 102b is connected to the optical distribution device 102a through the connector 104b internally including the filter 140b. Thus, after input into the optical distribution device 102b, the optical signal transmitted by the optical communication apparatus 110a and then output from the optical distribution device 102a is going to be output from the outputting unit 121b included in the optical distribution device 102b, similarly to the other optical signals, and to be returned into the optical distribution device 102a, again. However, the filter 140b included in the connector 104b attenuates the light whose wavelength is 650 nm different from the wavelength of the optical signal transmitted from the optical communication apparatus 110b, although the filter 140b passes 100% of light whose wavelength is 550 nm, i.e., the filter 140b passes 100% of the optical signal transmitted from the optical communication apparatus 110b. Therefore, the optical signal transmitted by the optical communication apparatus 110a and then output from the optical distribution device 102a cannot be received by the transceiver 112 included in the optical communication apparatus 110a, because this optical signal becomes to have weak power even if returned input into the optical distribution device 102a after input into the optical distribution device 102b.

Similarly, the optical communication apparatus 110b transmits data signal for allowing the data obtained through the own processing by itself to be utilized by another optical communication apparatus 110b or optical communication apparatus 110a. After being output from the optical communication apparatus 110b, the optical signal whose wavelength is 550 nm is input into one optically inputting unit 120b included in the optical distribution device 102b, and then output from four optically outputting units 121b, 121b, .... Therefore, the optical signal transmitted from the optical communication apparatus 110b can be received by four optical communication apparatuses 110b, 110b, ... including the transmission source optical communication apparatus. Furthermore, this optical signal is output from one optically outputting unit 121b among the four optically outputting units 121b, 121b, . . . toward the optical distribution device 102a via the connector 104b interiorly including the filter 140b. Because the filter 140b passes the optical signal whose wavelength is 550 nm but attenuates the optical signal whose wavelength is 650 nm, the filter 140b passes the optical signal transmitted from the optical communication apparatus 110b. Therefore, the optical signal transmitted from the optical communication apparatus 110b reaches to the optical distribution device 102a. Although this optical signal is input into the optically inputting unit 120a included in the optical distribution device 102a and then output from the optically outputting unit 121a connected to the optical distribution device 102b, this optical signal is attenuated by the filter 140a to become a weaker power signal and cannot be received by the transceiver 112 included in the optical communication apparatus 110b even if returned into the optical distribution device 102b As described above, the optical distribution device 102a is connected to the optical distribution device 102b, and the optical communication apparatus 110a and optical communication apparatus 110b can perform the transmission of optical signals based on the CAN protocol. Furthermore, it is possible to prevent the loop phenomenon caused on the optical signals between the optical distribution device 102a and optical distribution device 102b, because the filter 140a and filter 140b are provided.

As shown by FIG. 10 in the embodiment 4, it is possible to easily build the optical communication system that implements the optical communication based on the CAN protocol without the gateway (GW) apparatus, in the case that the optical communication harnesses 105a, 105b are prepared previously just to require respectively being connected to optical communication apparatuses 110a, 110a, . . . , 110b, 110b, . . . for building the optical communication system. Therefore, it is possible to implement the optical communication system based on the conventional CAN protocol while preventing the effects caused by the electromagnetic noise and ringing phenomenon.

Embodiment 5

In the embodiment 4, the filter 140a is included in the connector 104a that is connected to the optically outputting unit 121a, to which the optical communication apparatus 110a is not connected, among the optically outputting units 121a, 121a, . . . included in the optical distribution device 102a. However, an embodiment 5 utilizes a filter, corresponding to the filter 140a, which is integrated with the distribution device 102a.

The on-vehicle optical communication system in the embodiment 5 is configured similarly to the embodiment 4, except for an optical distribution apparatus 6 and a connector that does not include the filter 140a, instead of the optical distribution device 102a and connector 104a.

Figure 14:
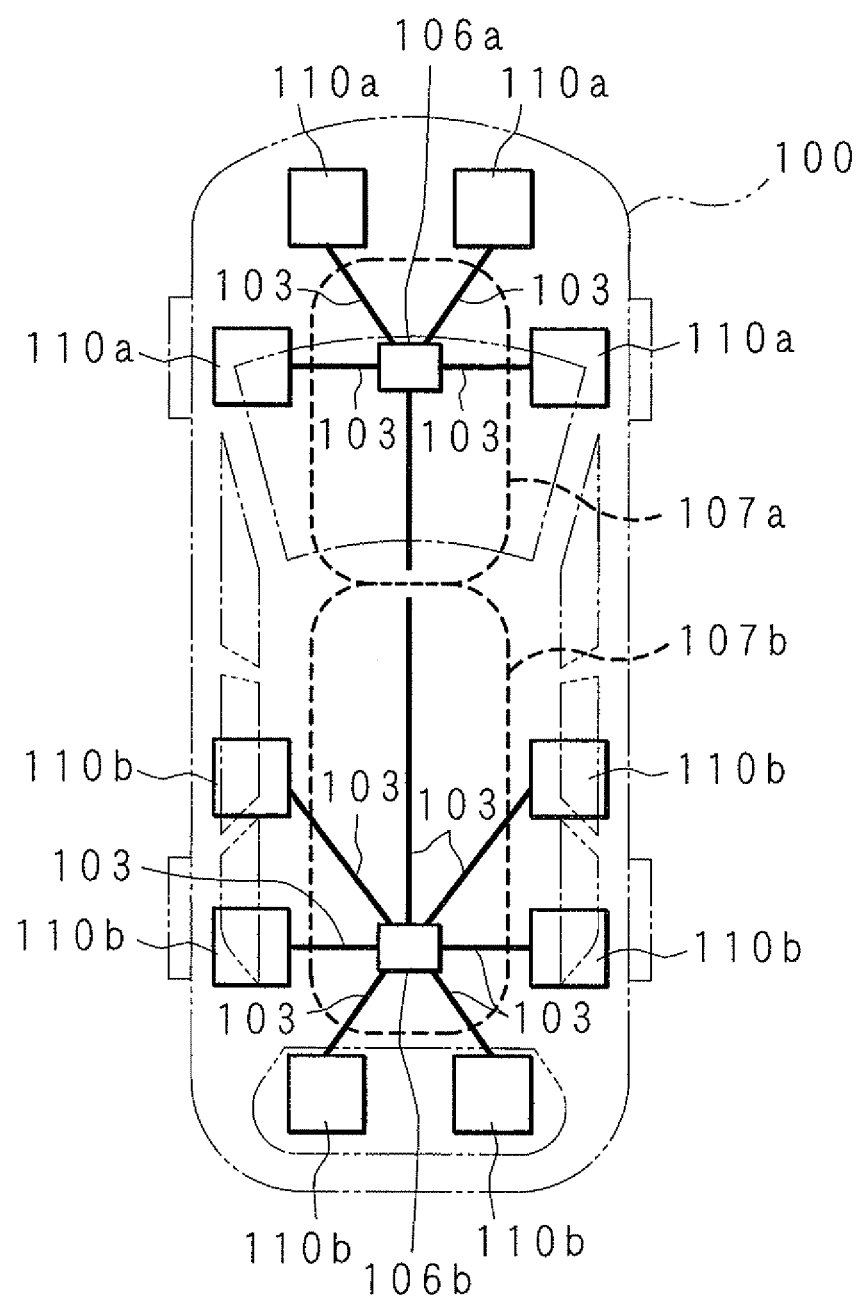
FIG. 14 is a block diagram showing the configuration of the on-vehicle optical communication system in an embodiment 5.

FIG. 14 is a block diagram showing the configuration of the on-vehicle optical communication system in the embodiment 5. The on-vehicle optical communication system in the embodiment 5 is mounted on the car 100, and provided with plural optical communication apparatuses 110a, 110a, . . . , 110b, 110b, . . . , the optical distribution apparatuses 106a, 106b, and the optical communication lines 103, 103, . . . . An optical communication harness 107a is configured with the optical distribution device 106a and optical communication line 103. Similarly, an optical communication harness 107b is configured with the optical distribution device 106b and optical communication line 103.

Plural optical communication apparatuses 110a, 110a, . . . are respectively connected through the optical communication lines 103, 103, . . . to the distribution apparatus 106a with the star topology. Similarly, plural optical communication apparatuses 110b, 110b, . . . are also connected through the optical communication lines 103, 103, . . . to the distribution apparatus 106a with the star topology, respectively. The optical distribution apparatus 106a is connected to the optical distribution 106b with the optical communication line 103, in which the line from the optical distribution apparatus 106a to the optical distribution apparatus 106b is distinct from the line from the optical distribution apparatus 106b to the optical distribution apparatus 106a.

Figure 15:
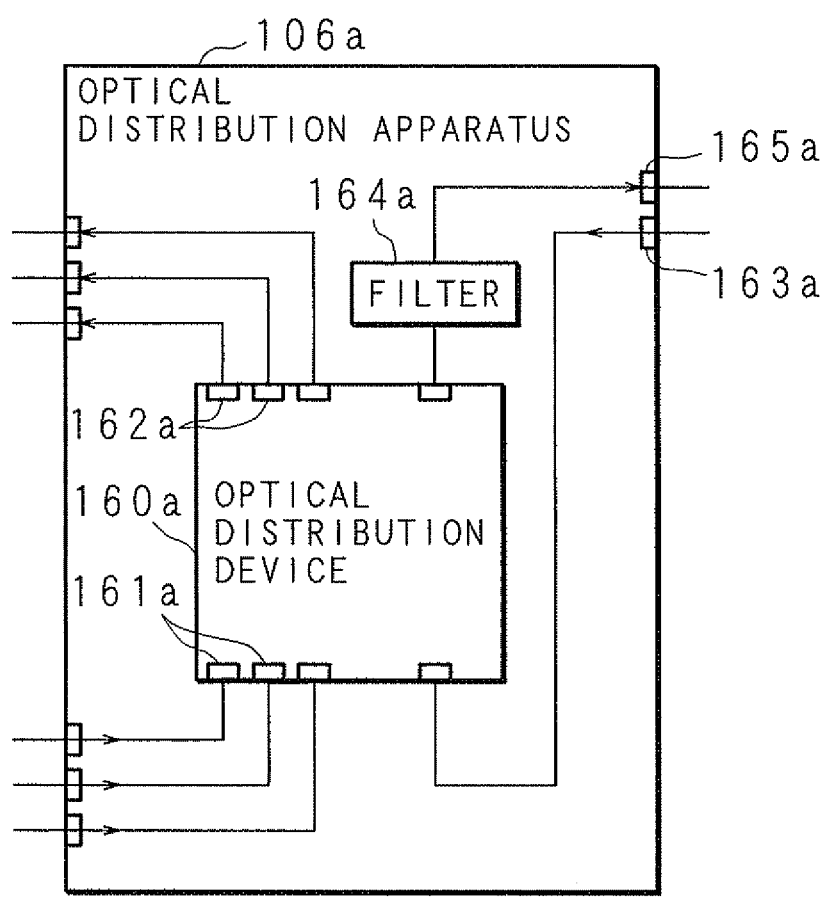
FIG. 15 is a block diagram showing the configuration of the optical distribution apparatus in the embodiment 5.

FIG. 15 is a block diagram showing the configuration of the optical distribution apparatus in the embodiment 5. The configurations of the optical distribution apparatus 106a is similar to those of the optical distribution apparatus 106b, and thus it will be described below in detail about the optical distribution apparatus 106a but not described below in detail about the optical distribution apparatus 106b.

The optical distribution apparatus 106a includes an optical distribution device 160a and a filter 164a.

Similarly in the embodiment 1, the optical distribution device 160a is configured with 4 two-input/two-output optical couplers that are inexpensive, and provided with four optically inputting units 161a, 161a, . . . at the one side and four optically outputting units at the other side. The optical distribution device 160a may be formed in a cylindrical or prismatic shape made of transparent material, such as transparent resin and glass. Three of these four optically inputting units 161a, 161a, . . . included in the optical distribution device 160a are connected to communication terminals through optical communication lines for being connected to the optical communication apparatuses 110a, 110a, . . . , and the other one of these four optically inputting units 161a, 161a, . . . is connected to a connecting terminal 163a through an optical communication line for being connected to another optical distribution apparatus 106b. One of these four optically outputting units 162a, 162a, . . . is connected to the filter 164a and the other three of four optically outputting units 162a, 162a, . . . are connected to the connecting terminals through optical communication lines for being connected to the optical communication apparatuses 110a, 110a, . . . .

The filter 164a is an optical filter, and connected to the communication terminal 165a through an optical communication line for being connected to the optical distribution apparatus 106b. The filter 164a is a HPF similar to the filter 140a in the embodiment 4, passes 100% of the light whose wavelength is 650 nm, i.e., passes 100% of the optical signal transmitted from the optical communication apparatus 110a that is connected to the optical distribution apparatus 106a, and attenuates the light whose wavelength is 550 nm, i.e., attenuates the optical signal transmitted from the optical communication apparatus 110b connected to the optical distribution apparatus 106b.

As not shown, the filter 64b is interiorly included in the optical distribution apparatus 106b connected to the optical communication apparatus 110b. The filter 64b is a LPF similar to the filter 140b, passes 100% of the light whose wavelength is 550 nm, i.e., passes 100% of the optical signal transmitted from the optical communication apparatus 110b connected to the optical distribution apparatus 106b, and attenuates the light whose wavelength is 650 nm, i.e., attenuates the optical signal transmitted from the optical communication apparatus 110a connected to the optical distribution apparatus 106a.

The optical distribution apparatus 106a and optical distribution apparatus 106b described above are connected to each other with the optical communication line 103 by the connection between the connection terminal 163a and connection terminal 65b, and by the connection between the connection terminal 165a and connection terminal 63b. Furthermore, the connection terminals included by the optical distribution apparatus 106a are connected to the optical communication apparatuses 110a, 110a, . . . and the connection terminals included by the optical distribution apparatus 106b are connected to the optical communication apparatuses 110b, 110b, . . . . Therefore, the configurations become similar to those of embodiment 4 shown in FIG. 12, it is possible to perform the transmission of optical signals based on the CAN protocol between the optical communication apparatus 110a and optical communication apparatus 110b, and further the filter 164a and filer 64b can prevent the loop phenomenon caused on the optical signals between the optical distribution apparatus 106a and optical distribution apparatus 106b.

As shown by FIG. 14 in the embodiment 5, it is possible to easily build the optical communication system that implements the optical communication based on the CAN protocol without the GW apparatus, in the case that the optical communication harnesses 107a, 107b are prepared previously just to require respectively being connected to optical communication apparatuses 110a, 110a, . . . , 110b, 110b, . . . for building the optical communication system. Therefore, it is possible to implement the optical communication system based on the conventional CAN protocol while preventing the effects caused by the electromagnetic noise and ringing phenomenon.

The embodiments 1-5 are explained in the context of the system implementing the optical communication based on the CAN protocol. However, the present invention is not limited to the CAN. It is possible to apply the present invention to an entire system that continuously monitors signals transmitted to a communication line, including the signals transmitted by itself, and implements the communication with optical signals based on a protocol for detecting the collision.

In addition, the embodiments 1-5 are explained in the context of the on-vehicle network. However, the present invention is not limited to such an on-vehicle network. It is possible to apply the present invention to another CAN communications, such as factory automation (FA).

It should be understood that the embodiments described herein are only illustrative of the present invention and that various modifications may be made thereto without departing from the scope of the invention as defined in the appended claims.

The invention claimed is:

1. A communication system, comprising:
an optical distribution device that outputs an input optical signal; and
plural optical communication apparatuses, each of which is connected to the optical distribution device, wherein
the optical distribution device comprises:
plural optically inputting units, into each of which an optical signal is inputted, and each of the plural optically inputting units is connected to each of the plural optical communication apparatuses; and
plural optically outputting units, each of which outputs an optical signal and is connected to each of the plural optical communication apparatuses,
an optical signal input into an optically inputting unit among the plural inputting units is output from all of the plural outputting units, and each optical communication apparatus comprises:
an optically transmitting unit that transmits an optical signal to an optically inputting unit among the plural optically inputting units;
an optically receiving unit that receives an optical signal output from an optically outputting unit among the plural optically outputting units; and
a collision detecting unit that detects whether a transmission of an optical signal performed by the optically transmitting unit of said each optical communication apparatus collides with a transmission of an optical signal performed by another optically transmitting unit comprised by another optical communication apparatus; wherein
the communication system further comprises:
another optical distribution device that is configured similarly to the optical distribution device; and
another plural optical communication apparatuses that are connected to said another optical distribution device and are configured similarly to the plural optical communication apparatuses; wherein
a predetermined optically outputting unit in the optical distribution device is connected through a first filter to said another optical distribution device,
a predetermined optically outputting unit in said another optical distribution device is connected through a second filter to the optical distribution device,
the first filter attenuates an optical signal whose wavelength is different from a wavelength of an optical signal to be transmitted from the plural optical communication apparatuses, but not an optical signal whose wavelength is not different from the wavelength of the optical signal to be transmitted from the plural optical communication apparatuses,
the second filter attenuates an optical signal whose wavelength is different from a wavelength of an optical signal to be transmitted from said another plural optical communication apparatuses, but not an optical signal whose wavelength is not different from the wavelength of the optical signal to be transmitted from said another plural optical communication apparatuses; and
the wavelength of the optical signal to be transmitted from the plural optical communication apparatuses is different from the wavelength of the optical signal to be transmitted from said another plural optical communication apparatuses.

2. A communication system according to claim 1, wherein
the communication system is mounted on a vehicle, and
the plural optical communication apparatuses utilizes an optical signal for communicating information about the vehicle.

3. A communication system according to claim 1, wherein
the collision detecting unit detects that the collision does not occur when an optical signal transmitted by the optically transmitting unit is identical to an optical signal received by the optically receiving unit, and detects that the collision occurs when the optical signal transmitted by the optically transmitting unit is not identical to the optical signal received by the optically receiving unit, and
the optically transmitting unit stops transmitting an optical signal, when the collision detecting unit detects that the collision occurs.

4. A communication system according to claim 1, further comprising:
an optical communication line that connects the optically transmitting unit and an optically inputting unit to which the optically transmitting unit transmits an optical signal, wherein
a length of the optical communication line is substantially a same length of another optical communication line that connects another optically transmitting unit and another optically inputting unit to which said another optically transmitting unit transmits an optical signal.

5. A communication system according to claim 1, wherein
the optically transmitting unit performs a transmission of an optical signal based on a CAN protocol, and
the optically receiving unit performs a reception of an optical signal based on a CAN protocol.

6. A communication system according to claim 1, wherein
the optical distribution device is configured with an optical coupler having two optically inputting units and two optically outputting units.

7. A communication system according to claim 1, further comprising:
an electrical communication apparatus that is connected to the plural optical communication apparatuses and utilizes an electrical signal to perform a communication, wherein
a predetermined optical communication apparatus among the plural optical communication apparatuses comprises:
an electrically transmitting unit that transmits an electrical signal;
an electrically receiving unit that receives an electrical signal; and
an opto-electric converting unit that converts an optical signal received by the optically receiving unit of the predetermined optical communication apparatus into an electrical signal, and converts an electrical signal received by the electrically receiving unit into an optical signal, and
the predetermined optical communication apparatus mediates a communication between the electrical communication apparatus and another optical communication apparatus.

8. A communication system according to claim 7, wherein
the optically transmitting unit performs a transmission of an optical signal based on a CAN protocol, and
the optically receiving unit performs a reception of an optical signal based on a CAN protocol.

9. A communication system according to claim 7, wherein
said predetermined optical communication apparatus is an opto-electric conversion apparatus.

10. A communication system according to claim 9, further comprising:
plural optical communication networks, each of which is configured with the optical distribution device and the plural optical communication apparatuses including the opto-electric conversion apparatus, wherein
the opto-electric conversion apparatus in each optical communication network is connected through an electrical communication line to another opto-electric conversion apparatus in another optical communication network.

11. A communication system according to claim 1, wherein
the optically transmitting unit performs a transmission of an optical signal based on a CAN protocol, and
the optically receiving unit performs a reception of an optical signal based on a CAN protocol.

12. A communication harness, comprising:
an optical distribution device that outputs an input optical signal;
plural optical communication apparatuses;
plural optical communication lines that are connected to the optical distribution device; and
a filter that attenuates an optical signal having a predetermined wavelength, wherein
the optical distribution device comprises plural optically inputting units and plural optically outputting units, each of the plural optically inputting units is connected to each of the plural optical communication apparatuses, and each of the plural optically outputting units is connected to each of the plural optical communication apparatuses,
an optical signal input into an optically inputting unit among the plural optically inputting units is output from all of the plural optically outputting units, and
each optical communication line is connected to one of the plural optically inputting units or one of the optically outputting units; wherein
the communication harness further comprises:
another optical distribution device that is configured similarly to the optical distribution device; and
another plural optical communication apparatuses that are connected to said another optical distribution device and are configured similarly to the plural optical communication apparatuses; wherein
a predetermined optically outputting unit in the optical distribution device is connected through a first filter to said another optical distribution device,
a predetermined optically outputting unit in said another optical distribution device is connected through a second filter to the optical distribution device,
the first filter attenuates an optical signal whose wavelength is different from a wavelength of an optical signal to be transmitted from the plural optical communication apparatuses, but not an optical signal whose wavelength is not different from the wavelength of the optical signal to be transmitted from the plural optical communication apparatuses,
the second filter attenuates an optical signal whose wavelength is different from a wavelength of an optical signal to be transmitted from said another plural optical communication apparatuses, but not an optical signal whose wavelength is not different from the wavelength of the optical signal to be transmitted from said another plural optical communication apparatuses; and
the wavelength of the optical signal to be transmitted from the plural optical communication apparatuses is different from the wavelength of the optical signal to be transmitted from said another plural optical communication apparatuses.

13. A communication harness according to claim 12, further comprising:
another optical distribution device that is connected to the optical distribution device and is configured similarly to the optical distribution device; and
another filter that is configured similarly to the filter, wherein
the optical distribution device interiorly comprises a first communication connector that is connected to said another optical distribution device,
said another optical distribution device interiorly comprises a second communication connector that is connected to the optical distribution device, the filter is arranged at the first communication connector, and said another filter is arranged at the second communication connector.

14. A communication harness according to claim 13, wherein
a wavelength of an optical signal attenuated by the filter is different from a wavelength of an optical signal attenuated by said another filter.

15. A communication harness according to claim 12, wherein
the optical distribution device is configured with an optical coupler having two optically inputting units and two optically outputting units.

16. An optical distribution apparatus, comprising:
an optical distribution device that outputs an input optical signal;
plural optical communication apparatuses; and
a filter that attenuates an optical signal having a predetermined wavelength, wherein
the optical distribution device comprises plural optically inputting units and plural optically outputting units, each of the plural optically inputting units is connected to each of the plural optical communication apparatuses, and each of the plural optically outputting units is connected to each of the plural optical communication apparatuses,
an optical signal input into an optically inputting unit among the plural optically inputting units is output from all of the plural optically outputting units, and
the filter is connected to a predetermined optically outputting unit among the plural optically outputting units; wherein
the optical distribution apparatus further comprises:
another optical distribution device that is configured similarly to the optical distribution device; and
another plural optical communication apparatuses that are connected to said another optical distribution device and are configured similarly to the plural optical communication apparatuses; wherein
a predetermined optically outputting unit in the optical distribution device is connected through a first filter to said another optical distribution device,
a predetermined optically outputting unit in said another optical distribution device is connected through a second filter to the optical distribution device,
the first filter attenuates an optical signal whose wavelength is different from a wavelength of an optical signal to be transmitted from the plural optical communication apparatuses, but not an optical signal whose wavelength is not different from the wavelength of the optical signal to be transmitted from the plural optical communication apparatuses,
the second filter attenuates an optical signal whose wavelength is different from a wavelength of an optical signal to be transmitted from said another plural optical communication apparatuses, but not an optical signal whose wavelength is not different from the wavelength of the optical signal to be transmitted from said another plural optical communication apparatuses; and
the wavelength of the optical signal to be transmitted from the plural optical communication apparatuses is different from the wavelength of the optical signal to be transmitted from said another plural optical communication apparatuses.

17. An optical distribution apparatus according to claim 16, wherein
the optical distribution device is configured with an optical coupler having two optically inputting units and two optically outputting units.

* * * * *